United States Patent
Smith et al.

(10) Patent No.: US 11,717,956 B1
(45) Date of Patent: Aug. 8, 2023

(54) ROBOTIC JOINT SYSTEM WITH INTEGRATED SAFETY

(71) Applicant: Sarcos Corp., Salt Lake City, UT (US)

(72) Inventors: Fraser M. Smith, Salt Lake City, UT (US); Marc X. Olivier, Salt Lake City, UT (US); Michael J. Myers, Salt Lake City, UT (US); Chris Hirschi, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 17/897,762

(22) Filed: Aug. 29, 2022

(51) Int. Cl.
*B25J 9/00* (2006.01)

(52) U.S. Cl.
CPC .................. *B25J 9/0006* (2013.01)

(58) Field of Classification Search
CPC .............. B25J 9/0006; B25J 9/144
See application file for complete search history.

(56) References Cited

U.S. PATENT DOCUMENTS

| | | | |
|---|---|---|---|
| 1,880,138 | A | 9/1932 | Franz |
| 2,850,189 | A | 9/1958 | Leroy |
| 2,981,198 | A | 4/1961 | Nettel |
| 3,171,549 | A | 3/1965 | Orloff |
| 3,280,991 | A | 10/1966 | Melton et al. |
| 3,306,646 | A | 2/1967 | Flora, Jr. |
| 3,358,678 | A | 12/1967 | Kulstar |
| 3,449,008 | A | 6/1969 | Colechia |
| 3,449,769 | A | 6/1969 | Mizen |
| 3,535,711 | A | 10/1970 | Fick |
| 3,759,563 | A | 9/1973 | Kitamura |
| 3,858,468 | A | 1/1975 | Pasbrig |
| 4,046,262 | A | 9/1977 | Vykukal et al. |
| 4,179,233 | A | 12/1979 | Bromell et al. |

(Continued)

FOREIGN PATENT DOCUMENTS

| | | |
|---|---|---|
| CN | 101214653 A | 7/2008 |
| CN | 101823517 A | 9/2010 |

(Continued)

OTHER PUBLICATIONS

Aghili et al., Sensing the torque in a robot's joints, www.memagazine.org/backissues/september98/features/torque/torque.html, 1998, pp. 1-9, The American Society of Mechanical Engineers.

(Continued)

*Primary Examiner* — Bobby Rushing, Jr.

(57) ABSTRACT

A robotic joint system with integrated safety can include a first support member, a second support member, and a tunable actuator joint assembly including a joint having an axis of rotation about which the first support member and the second support member rotate. The tunable actuator joint assembly can include a primary actuator and a quasi-passive linear pneumatic actuator coupled between the first and second support members. The quasi-passive linear pneumatic actuator can comprise an active state in which the quasi-passive linear pneumatic actuator stores energy upon a first rotation of the first and second support members and releases energy upon a second rotation of the first and second support members opposite the first rotation, and an inactive state that facilitates return of the first and second support members to a default position.

46 Claims, 8 Drawing Sheets

(56) References Cited

U.S. PATENT DOCUMENTS

| | | |
|---|---|---|
| 4,200,596 A | 4/1980 | Iiyama et al. |
| 4,251,791 A | 2/1981 | Yanagisawa et al. |
| 4,367,891 A | 1/1983 | Wauer et al. |
| 4,398,110 A | 8/1983 | Flinchbaugh et al. |
| 4,483,407 A | 11/1984 | Iwamoto et al. |
| 4,561,686 A | 12/1985 | Atchley |
| 4,567,417 A | 1/1986 | Francois et al. |
| 4,575,297 A | 3/1986 | Richter |
| 4,591,944 A | 5/1986 | Gravel |
| 4,598,601 A | 7/1986 | Molaug |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,402,690 A | 4/1995 | Sekiguchi et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosier |
| 6,855,170 B2 | 2/2005 | Gramnas |
| 6,920,374 B2 | 7/2005 | Takenaka et al. |
| 7,168,748 B2 | 1/2007 | Townsend et al. |
| 7,319,919 B2 | 1/2008 | Takenaka et al. |
| 7,337,040 B2 | 2/2008 | Takenaka et al. |
| 7,379,789 B2 | 5/2008 | Takenaka et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,132,835 B2 | 3/2012 | Ban et al. |
| 8,151,401 B2 | 4/2012 | Cheyne |
| 8,182,010 B2 | 5/2012 | Lee et al. |
| 8,204,626 B2 | 6/2012 | Yoshiike et al. |
| 8,245,728 B2 | 8/2012 | Jacobsen et al. |
| 8,295,975 B2 | 10/2012 | Arimatsu et al. |
| 8,336,420 B2 * | 12/2012 | Carter .................. B25J 17/0275 901/27 |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,534,728 B1 | 9/2013 | Bosscher et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iversen et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,205,560 B1 | 12/2015 | Edsinger et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 | 5/2016 | Herr et al. |
| 9,446,510 B2 | 9/2016 | Vu et al. |
| 9,526,636 B2 | 12/2016 | Bedard et al. |
| 9,533,411 B2 | 1/2017 | Jacobsen et al. |
| 9,616,580 B2 | 4/2017 | Smith et al. |
| 9,618,937 B1 | 4/2017 | Blankespoor et al. |
| 9,643,323 B2 | 5/2017 | Nagatsuka et al. |
| 9,727,076 B2 | 8/2017 | Smith et al. |
| 9,789,603 B2 * | 10/2017 | Jacobsen ................ B25J 13/025 |
| 9,862,090 B2 | 1/2018 | Kennedy et al. |
| 9,895,812 B2 | 2/2018 | Gonzalez et al. |
| 9,926,025 B1 | 3/2018 | Blankespoor et al. |
| 10,028,844 B2 | 7/2018 | Cheng et al. |
| 10,071,485 B2 | 9/2018 | Schiele et al. |

(56) References Cited

U.S. PATENT DOCUMENTS

| | | |
|---|---|---|
| 10,216,177 B2 | 2/2019 | Gildert et al. |
| 10,300,969 B1 | 5/2019 | Blackespoor et al. |
| 10,406,676 B2 * | 9/2019 | Smith .................... B25J 19/005 |
| 10,512,583 B2 | 12/2019 | Smith |
| 10,533,542 B2 | 1/2020 | Smith et al. |
| 10,561,564 B2 | 2/2020 | LaChappelle et al. |
| 10,566,914 B2 | 2/2020 | Fujita et al. |
| 10,765,537 B2 * | 9/2020 | Smith ....................... A61F 2/70 |
| 10,828,767 B2 * | 11/2020 | Smith ....................... B25J 9/148 |
| 11,148,279 B1 | 10/2021 | Mooney et al. |
| 11,241,801 B2 | 2/2022 | Smith et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Wan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0056592 A1 | 3/2007 | Angold et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1 | 1/2008 | Perry et al. |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0149993 A1 | 6/2009 | Neki et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0234996 A1 | 9/2010 | Schreiber et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0217457 A1 | 8/2015 | Lipson et al. |
| 2015/0272749 A1 | 10/2015 | Amend, Jr. et al. |
| 2015/0278263 A1 | 10/2015 | Bowles et al. |
| 2015/0289995 A1 | 10/2015 | Wilkinson et al. |
| 2015/0321340 A1 | 11/2015 | Smith |
| 2015/0321342 A1 | 11/2015 | Smith et al. |
| 2016/0003268 A1 | 1/2016 | Shevchenko et al. |
| 2016/0114482 A1 | 4/2016 | Lessing et al. |
| 2016/0153508 A1 | 6/2016 | Battlogg |
| 2016/0279788 A1 | 9/2016 | Kanaoka et al. |
| 2016/0331556 A1 | 11/2016 | Wijesundara et al. |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2016/0332312 A1 | 11/2016 | Song et al. |
| 2017/0050310 A1 | 2/2017 | Kanaoka |
| 2017/0326737 A1 | 11/2017 | Martin et al. |
| 2018/0126548 A1 | 5/2018 | Sugito et al. |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |
| 2018/0221237 A1 | 8/2018 | Swift et al. |
| 2018/0290309 A1 | 10/2018 | Becker et al. |
| 2018/0298976 A1 | 10/2018 | Battlogg |
| 2019/0022853 A1 | 1/2019 | Kim et al. |
| 2019/0105777 A1 | 4/2019 | Dalley et al. |
| 2019/0138423 A1 | 5/2019 | Agerstam et al. |
| 2019/0176320 A1 | 6/2019 | Smith et al. |
| 2019/0184576 A1 | 6/2019 | Smith et al. |
| 2020/0001450 A1 | 1/2020 | Smith et al. |
| 2020/0164523 A1 | 5/2020 | Hallock et al. |
| 2020/0281803 A1 | 9/2020 | Teng et al. |
| 2020/0312109 A1 | 10/2020 | Shionozaki |
| 2020/0346009 A1 | 11/2020 | Murray et al. |
| 2020/0368094 A1 | 11/2020 | Yoshimi et al. |
| 2020/0405417 A1 | 12/2020 | Shelton, IV et al. |
| 2021/0023693 A1 | 1/2021 | Berger et al. |
| 2021/0039269 A1 | 2/2021 | Son |

(56) References Cited

U.S. PATENT DOCUMENTS

| | | | |
|---|---|---|---|
| 2021/0059780 A1 | 3/2021 | Sutherland et al. | |
| 2021/0369536 A1 | 12/2021 | Mooney et al. | |
| 2021/0378903 A1 | 12/2021 | Mooney et al. | |

FOREIGN PATENT DOCUMENTS

| | | |
|---|---|---|
| CN | 103610524 A | 3/2014 |
| CN | 203495949 U | 3/2014 |
| CN | 103802907 A | 5/2014 |
| CN | 203752160 U | 8/2014 |
| CN | 104843484 A | 8/2015 |
| CN | 105411813 A | 3/2016 |
| CN | 205250544 U | 5/2016 |
| CN | 105818143 A | 8/2016 |
| CN | 107471203 A | 12/2017 |
| CN | 108081303 A | 5/2018 |
| CN | 111267992 A | 6/2020 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H06-315879 A | 11/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2003-194104 A | 7/2003 |
| JP | 2004-105261 A | 4/2004 |
| JP | 2004-195576 A | 7/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2010-263761 A | 11/2010 |
| JP | 2011-067941 A | 4/2011 |
| JP | 2011-156171 A | 8/2011 |
| JP | 2011-193899 A | 10/2011 |
| JP | 2011-230260 A | 11/2011 |
| JP | 2012-501739 A | 1/2012 |
| JP | 2012-125279 A | 7/2012 |
| JP | 2012-176476 A | 9/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-208293 A | 10/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014-200853 A | 10/2014 |
| JP | 2015-112649 A | 6/2015 |
| JP | 2015-212010 A | 11/2015 |
| JP | 2015-214019 A | 12/2015 |
| JP | 2016-539017 A | 12/2016 |
| JP | 2018-167375 A | 11/2018 |
| JP | 2020-037164 A | 3/2020 |
| JP | 6748374 B2 | 9/2020 |
| KR | 2005-0037754 A | 4/2005 |
| KR | 2007-0057209 A | 6/2007 |
| KR | 2010-0112670 | 10/2010 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| SE | 515372 C2 | 7/2001 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2016/049622 A1 | 3/2016 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO 2019/060791 A1 | 3/2019 |
| WO | WO 2020/175949 A1 | 9/2020 |

OTHER PUBLICATIONS

Albu-Schaffer et al., A Unified Passivity Based Control Framework for Position, Torque and Impedance Control of Flexible Joint Robots, Institute of Robotics and Mechatronics, 2007, vol. 26, 17 pages, Germany.

Aliens (Movie), Starring Sigourney Weaver, Directed by James Cameron, Written by James Cameron, David Giler, Walter Hill, Dan O'Bannon, and Ronald Shuset, Released 1985 by Twentieth Cen-

(56) References Cited

OTHER PUBLICATIONS tury Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt0090605/.

Amikabir University of Technology, Manipulator Dynamics (Power Point), Computer Engineering and Information Technology Department, to the best of applicant's knowledge article was available before the application filing date, 44 pages.

Bao et al., A unified modeling and control design for precision transmission system with friction and backlash, Advances in Mechanical Engineering, 2016, vol. 8(5), 11 pages.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

David et al., Study of an External Passive Shock-absorbing Mechanism for Walking Robots, 8th IEEE International Conference on Humanoid Robots, Dec. 1-3, 2008, pp. 435-440, Institute of Electrical and Electronics Engineers, Piscataway, New Jersey.

Desai et al., Robust Swing Leg Placement under Leg Disturbances, 2012 IEEE International Conference on Robotics and Biomimetics, Dec. 11-14, 2012, pp. 265-270, China.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Filippeschi et al., Survey of Motion Tracking Methods on Inertial Sensors: A Focus on Upper Limb Human Motion, www.mdpi.com/journal/sensors, 2017, 40 pages, Sensors, Switzerland.

Gauthier et al., Magnetic Shape Memory Alloy and Actuator Design, Conference: 5th International Workshop on Microfactories (IWMF'06), Oct. 2006, 5 pages, Besanon, France.

Grabowski et al., Exoskeletons for Running and Hopping Augmentation, Journal of Applied Physiology, http://biomech.media.mit.edu/portfolio_page/load-bearing-exoskeleton-for-augmentaton-of-human-running/, 2009, 4 pages, vol. 107, No. 3, American Physiological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers for Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.

Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.

Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kaslin et al., Towards a Passive Adaptive Planar Foot with Ground Orientation and Contact Force Sensing for Legged Robots, IEEE International Conference on Intelligent Robots and Systems, Oct. 1-5, 2018, pp. 2707-2714, Institute of Electrical and Electronics Engineers, Piscataway, New Jersey.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al., A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon. University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Liu et al., Cat-inspired Mechanical Design of Self-Adaptive Toes for a Legged Robot, IEEE International Conference on Intelligent Robots and Systems, Oct. 9-14, 2016, pp. 2425-2430, Institute of Electrical and Electronics Engineers, Piscataway, New Jersey.

Liu et al., Concept and Design of a Lightweight Biped Robot for Walking on Rough Terrain, IEEE International Conference on Robotics and Biomimetics, 2017, 6 pages, Institute of Electrical and Electronics Engineers, Piscataway, New Jersey.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

(56) References Cited

OTHER PUBLICATIONS

Mombaur et al., HEiKA-EXO: Optimization-based development and control of an exoskeleton for medical applications, http://typo.iwr.uni-heidelberg.de/groups/orb/research/heika-exo/. Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, ¼-20 Thread, http://search.newport.com/?q=*&x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Ott et al., Admittance Control using a Base Force/Torque Sensor, Department of Mechano-Informatics, 2009, 6 pages, University of Tokyo, Japan.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Roetenberg et al., Xsens MVN: Full 6DOF Human Motion Tracking Using Miniature Inertial Sensors, XSENS—Inertial Motion Capture, Jan. 2009, 9 pages, XSENS Technologies.

Rouse et al., Clutchable Series—Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.en/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3, PLOS One, San Francisco, California.

Siddharth et al., Design and Analysis of a 1-DOF Walking Mechanism, http://siddharthswaminathan.in/files/WalkingMechanism.pdf, Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al., Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.

Suleiman, Engineering an affordable exoskeleton, Phys.org, https://phys.org/news/2014.06-exoskeleton.html, Jun. 12, 2014, 5 pages, Science X Network.

Szczesna et al., Inertial Motion Capture Costume Design Study, 2017, 21 pages, Sensors, Switzerland.

Tmsuk, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton For Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the $10^{th}$ International Workshop on Robot Motion and Control, Jul. 6-8, 2015, 6 pages, IEEE, Poland.

\* cited by examiner

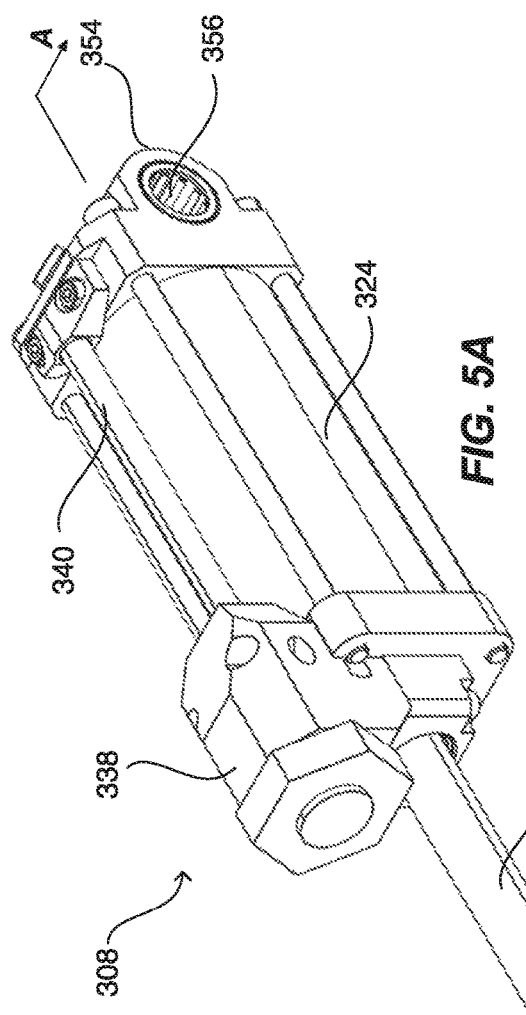
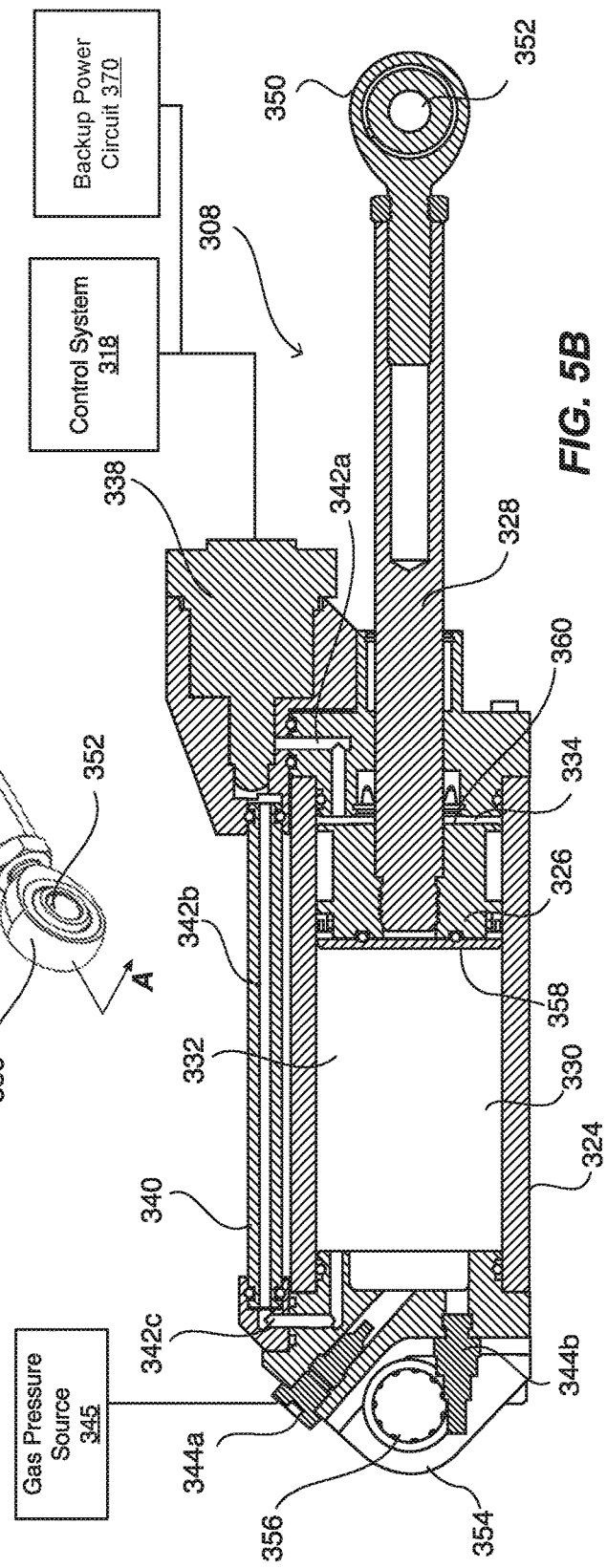
FIG. 5A
FIG. 5B

ROBOTIC JOINT SYSTEM WITH INTEGRATED SAFETY

BACKGROUND

A wide variety of exoskeleton, humanoid, robotic arms, and other robots or robotic systems exist, many of which seek the most efficient operation possible. One fundamental technical problem that continues to be a focus is how such systems, such as where energetic autonomy is concerned, can minimize power consumption while still providing acceptable levels of force output. Indeed, power and how this is obtained and utilized remains an inevitable challenge in the world of robotics.

Designers of such robotic systems typically attempt to optimize operation based on the intended use or application. In many cases, either power or efficiency is sacrificed, at least to some extent. For instance, some robotic systems employ high-output power systems that can meet the force output demands of the robotic system, putting this ahead of any efficiency considerations. On the other hand, some robotic systems employ more efficient power systems in an attempt to improve efficiency, with force output being a secondary consideration.

High output force or power robotic systems designed to assist humans in various work related or other tasks, while capable of performing such tasks, can be costly. Moreover, such robotic systems often are tethered to a power source as portable power remains limited in its capabilities. Efficient, yet low force output robotic systems can lack practicality for many applications to assist humans, inasmuch as many robotic systems that are designed to assist humans in work related or other tasks require levels of force that can at least match and preferably exceed the levels of force output that a human could provide in order to perform the task(s).

Overall, the power issue has been a challenging obstacle in the design of robotic systems with various efforts being made to maximize output while minimizing power consumption. Even small advances in this ratio of power to output energy consumption can be highly beneficial. While much research and development is ongoing to improve power sources, another way robotic systems can improve the power to energy output ratio is through the structural build of the robotic system, namely the way various components are configured, how these are controlled, and if the systems can take advantage of naturally occurring phenomenon, such as gravity or momentum.

SUMMARY

An initial summary of the disclosed technology is provided here. Specific technology examples are described in further detail below. This initial summary is intended to set forth examples and aid readers in understanding the technology more quickly, but is not intended to identify key features or essential features of the technology nor is it intended to limit the scope of the claimed subject matter.

In one example of the present disclosure, a robotic joint system with integrated safety is provided. The joint system can comprise a first support member, a second support member, and a tunable actuator joint assembly rotatably coupling the first support member to the second support member. The tunable actuator joint assembly can comprise a joint having an axis of rotation about which the first support member and the second support member rotate.

The tunable actuator joint assembly can comprise a primary actuator operable to apply a primary torque to facilitate actuation of the first and second support members about the joint and a quasi-passive linear pneumatic actuator coupled between the first and second support members. The quasi-passive linear pneumatic actuator can be operable to apply a secondary torque to facilitate actuation of the first and second support members about the joint.

The quasi-passive linear pneumatic actuator can comprise a housing that is gas pressure charged with a gas at a selected gas pressure, a piston supported within the housing, and a piston rod extending from the piston. The piston and the piston rod can be movable in a linear motion within the housing. The piston can be disposed in an internal chamber of the housing, and can divide a compression chamber and an expansion chamber within the housing.

The quasi-passive linear pneumatic actuator can further comprise a gas passageway that fluidly connects the compression chamber and the expansion chamber, and a valve in fluid communication with the gas passageway that selectively restricts flow through the gas passageway. The valve can be operable to default to an open position.

The quasi-passive linear pneumatic actuator can comprise an active state with the valve closed. In the active state, the piston compresses the gas in the compression chamber to cause the quasi-passive linear pneumatic actuator to store energy upon a first rotation of the first and second support members about the joint and to release energy upon a second rotation of the first and second support members about the joint in a direction opposite a direction of the first rotation to apply the secondary torque to facilitate the first and second rotations of the first and second support members about the joint.

The quasi-passive linear pneumatic actuator can also comprise an inactive state with the valve open. In the inactive state, gas flows through the gas passageway between the compression chamber and the expansion chamber and a net force acting on the piston biases the piston and piston rod to an extended position, such that the secondary torque is applied to facilitate return of the first and second support members to a default position about the joint.

In some examples, the piston rod can be coupled to one of the first support member or the second support member such that actuation of the quasi-passive linear pneumatic actuator in the active state applies the secondary torque to one of the first support member or the second support member.

In some examples, the secondary torque applied by the quasi-passive linear pneumatic actuator is operable to compensate against a gravitational force acting on the joint system.

In some examples, the piston rod can be coupled to one of the first support member or the second support member via a linkage. In one example, the tunable actuator joint assembly can also comprise a load cell supported on the linkage. The load cell can be configured to sense and measure a force applied by the quasi-passive linear pneumatic actuator. The primary torque applied by the primary actuator can be based at least in part from feedback received from the load cell. The piston rod and the linkage can define a four-bar mechanism coupling the quasi-passive linear pneumatic actuator between the first support member and the second support member. The linkage can be coupled to an output member of the primary actuator. The output member can be oriented along the axis of rotation of the joint.

In some examples, an end of the housing opposite the piston rod can be pivotally coupled to one of the first support member or the second support member via a linkage. In some examples, the tunable actuator joint assembly can further comprise a force sensor associated with the quasi-passive linear pneumatic actuator operable to sense a force or load applied by of the quasi-passive linear pneumatic actuator.

In some examples, the secondary torque applied by the quasi-passive linear pneumatic actuator in the active and inactive states combines with the primary torque applied to the joint by the primary actuator to produce an aggregate torque. The aggregate torque can comprise the secondary torque applied by the quasi-passive linear pneumatic actuator in either of the active and inactive states in the same rotational direction as the primary torque applied to the joint by the primary actuator. The aggregate torque can comprise the primary torque applied by the primary actuator in a direction so as to oppose the secondary torque applied by the quasi-passive linear pneumatic actuator in either of the active and inactive states. In some examples, the primary torque from the primary actuator at least partially causes the first rotation. Energy can be stored in the quasi-passive linear pneumatic actuator upon the first rotation of the joint.

In some examples, the quasi-passive linear pneumatic actuator operates in the inactive state with the valve in the open position upon a failure of the primary actuator. The quasi-passive linear pneumatic actuator can also operate in the inactive state with the valve in the open position upon primary power loss to the robotic joint system. In some examples, the gas passageway extends outside of the housing.

In some examples, the valve can be biased to the open position. In other examples, the system can comprise a backup power circuit operable to move the valve to the open position or to retain the valve in the open position.

In another example according to the present disclosure, a method for configuring a robotic joint system with integrated safety is provided. The method can comprising rotatably coupling a first support member to a second support member via a tunable actuator joint assembly comprising a joint having an axis of rotation about which the first support member and the second support member rotate, configuring the tunable actuator joint assembly to comprise a primary actuator operable to apply a primary torque to cause rotation of the first and second support members about the joint, configuring the tunable actuator joint assembly with a quasi-passive linear pneumatic actuator, and configuring the tunable actuator joint assembly with a valve operable to control operation of the quasi-passive linear pneumatic actuator. The valve can be operable to default to an open position.

The method can further comprise configuring the quasi-passive linear pneumatic actuator to comprise an inactive state with the valve open. In the inactive state, the quasi-passive linear pneumatic actuator can facilitate a return of the first and second support members to a default position about the joint. The method can also comprise configuring the quasi-passive linear pneumatic actuator to comprise an active state with the valve at least partially closed. In the active state, the quasi-passive linear pneumatic actuator can facilitate storage of energy upon a first rotation of the first and second support members about the joint and release of energy upon a second rotation of the first and second support members about the joint opposite the first rotation to apply a secondary torque to the joint.

In some examples, the method comprises coupling a piston rod of the quasi-passive linear pneumatic actuator to the first support member or the second support member such that actuation of the piston rod applies the secondary torque. The piston rod can be coupled to one of the first support member or the second support member via a linkage. The housing can be coupled to the other of the first support member or the second support member.

In some examples, the piston rod and the linkage can define a four-bar mechanism coupling the quasi-passive linear pneumatic actuator between the first support member and the second support member. The linkage can be coupled to the output member of the primary actuator. The method can further comprise configuring the output member along the axis of rotation of the joint.

In some examples, the method further comprises configuring the tunable actuator joint assembly with a force sensor operable to sense an applied force or load from the quasi-passive linear pneumatic actuator. The force sensor can comprise a load cell.

In some examples, the secondary torque from the quasi-passive linear pneumatic actuator can combine with the primary torque from the primary actuator to provide an aggregate torque operable to rotate the first and second support members about the joint. In some examples, the primary torque from the primary actuator at least partially causes the first rotation. Energy is stored in the quasi-passive linear pneumatic actuator upon the first rotation of the joint.

In some examples, the quasi-passive linear pneumatic actuator operates in the inactive state with the valve in the open position upon a failure of the primary actuator. The quasi-passive linear pneumatic actuator can also operate in the inactive state with the valve in the open position upon primary power loss to the quasi-passive linear pneumatic actuator. The quasi-passive linear pneumatic actuator can be operable in parallel with the primary actuator.

According to another example of the present disclosure, a tunable actuator joint assembly operable to rotatably couple to a first support member and to a second support member is provided. The tunable actuator joint assembly can comprise a joint having an axis of rotation about which the first support member and the second support member rotate. The tunable actuator joint assembly can comprise a quasi-passive linear pneumatic actuator operable to couple between the first and second support members.

The quasi-passive linear pneumatic actuator can comprise a housing that is gas pressure charged with a gas at a selected gas pressure, a piston, and a piston rod extending from the piston. The piston and the piston rod can be movable in a linear motion within the housing. The piston can be disposed in an internal chamber of the housing, and can divide a compression chamber and an expansion chamber within the housing.

The quasi-passive linear pneumatic actuator can further comprise a gas passageway that fluidly connects the compression chamber and the expansion chamber, and a valve in fluid communication with the gas passageway that selectively restricts flow through the gas passageway. The valve can be operable to default to an open position.

The quasi-passive linear pneumatic actuator can comprise an active state with the valve closed. In the active state, the piston compresses the gas in the compression chamber to cause the quasi-passive linear pneumatic actuator to store energy upon a first rotation of the first and second support members about the joint and to release energy upon a second rotation of the first and second support members about the joint in a direction opposite a direction of the first rotation to apply a torque to facilitate the first and second rotations of the first and second support members about the joint.

The quasi-passive linear pneumatic actuator can also comprise an inactive state with the valve open. In the inactive state, gas flows through the gas passageway between the compression chamber and the expansion chamber and a net force acting on the piston biases the piston and piston rod to an extended position to facilitate return of the first and second support members to a default position about the joint.

In some examples, the tunable actuator joint assembly can further comprise a primary actuator operable to apply a primary torque to facilitate the first and second rotations of the first and second support members about the joint. In some examples, the valve device can comprise an on-off valve. In some embodiments, the valve device comprises at least one of a proportional valve or a servo valve According to another example, a robotic joint system with integrated safety is provided that comprises any of the example elements discussed herein. The robotic joint can comprise a first support member, a second support member, and a tunable actuator joint assembly rotatably coupling the first support member to the second support member. The tunable actuator joint assembly can comprise a joint having an axis of rotation about which the first support member and the second support member rotate. The tunable actuator joint assembly can further comprise a quasi-passive linear pneumatic actuator coupled between the first and second support members. The quasi-passive linear pneumatic actuator can comprise a housing that is gas pressure charged with a gas at a selected gas pressure, a piston and a piston rod extending from the piston. The piston and the piston rod can be movable in a linear motion within the housing. The piston can divide a compression chamber and an expansion chamber within the housing. The quasi-passive pneumatic actuator can also comprise a valve assembly operable to control operating states of the quasi-passive linear pneumatic actuator. The valve assembly can comprise a gas passageway that fluidly connects the compression chamber and the expansion chamber, and a valve device in fluid communication with the gas passageway that selectively restricts flow through the gas passageway. The valve device can be operable to default to an open position.

The quasi-passive linear pneumatic actuator can comprise an active state with the valve closed, such that the piston compresses the gas in the compression chamber to cause the quasi-passive linear pneumatic actuator to store energy upon a first rotation of the first and second support members about the joint and to release energy upon a second rotation of the first and second support members about the joint in a direction opposite a direction of the first rotation to apply a torque to facilitate the first and second rotations of the first and second support members about the joint.

The quasi-passive linear pneumatic actuator can also comprise an inactive state with the valve open, such that gas flows through the gas passageway between the compression chamber and the expansion chamber, and a net force acting on the piston biases the piston and piston rod to an extended position to facilitate return of the first and second support members to a default position about the joint.

In one example, the tunable actuator joint assembly can further comprise a primary actuator operable to apply a primary torque to facilitate the first and second rotations of the first and second support members about the joint.

In one example, the valve device of the valve assembly can comprise a two-stage valve (on-off valve).

In one example, the valve device can be modulated to operate the quasi-passive linear pneumatic actuator in a semi-active state.

In one example, the valve device of the valve assembly can comprise at least one of a proportional valve or a servo valve operable to place the valve device in a partially open position, wherein the quasi-passive linear pneumatic actuator comprises a semi-active state with the valve device partially open or modulated so as to function as at least one of a brake or a damper.

In one example, with the quasi-passive linear pneumatic actuator in the semi-active state, the piston can partially compress the gas in the compression chamber to cause the quasi-passive linear pneumatic actuator to store at least some amount of energy upon the first rotation.

In one example, the quasi-passive linear pneumatic actuator, in the semi-active state, operates to release the at least some amount of stored energy upon the second rotation (in a different direction as compared to the direction of the first rotation). In one example, the tunable actuator joint assembly can comprise a non-powered tunable actuator joint assembly where the first rotation can be caused at least partially by a movement of a user (i.e., a tunable actuator joint assembly actuatable via movements from a user).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3A is a side view of a robotic joint system of the robotic system of FIGS. 2A and 2B, the joint system comprising a tunable actuator joint assembly connected to first and second support members in accordance with an example of the present disclosure, with the first and second support members shown in an extended position;

FIG. 3B is a side view of the robotic joint system of FIG. 3A, with the support members shown in an intermediate position;

FIG. 5A shows a perspective view of a quasi-passive linear pneumatic actuator of the joint system of FIG. 3A;

FIG. 5B shows a section view of the quasi-passive linear pneumatic actuator shown in FIG. 5A taken along line A-A of FIG. 5A;

Reference will now be made to the exemplary embodiments illustrated, and specific language will be used herein to describe the same. It will nevertheless be understood that no limitation of the scope of the invention is thereby intended.

DETAILED DESCRIPTION

Figure 1:
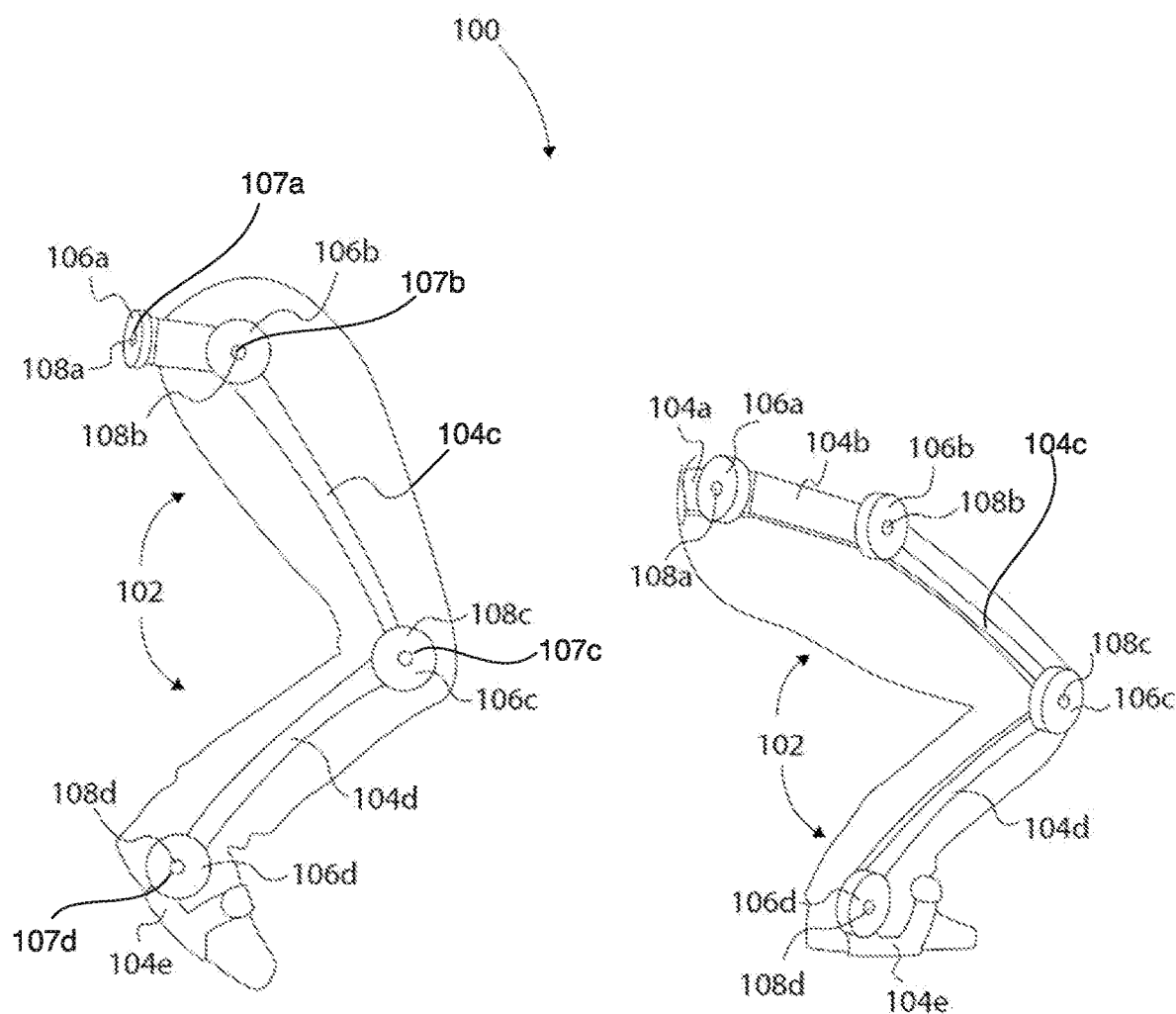
FIG. 1 illustrates a graphical representation of a robotic system in the form of a lower portion of an exoskeleton (or lower body exoskeleton) having at least one tunable actuator joint assembly in accordance with an example of the present disclosure, the robotic system being shown in two operating positions.
Figure 2A:
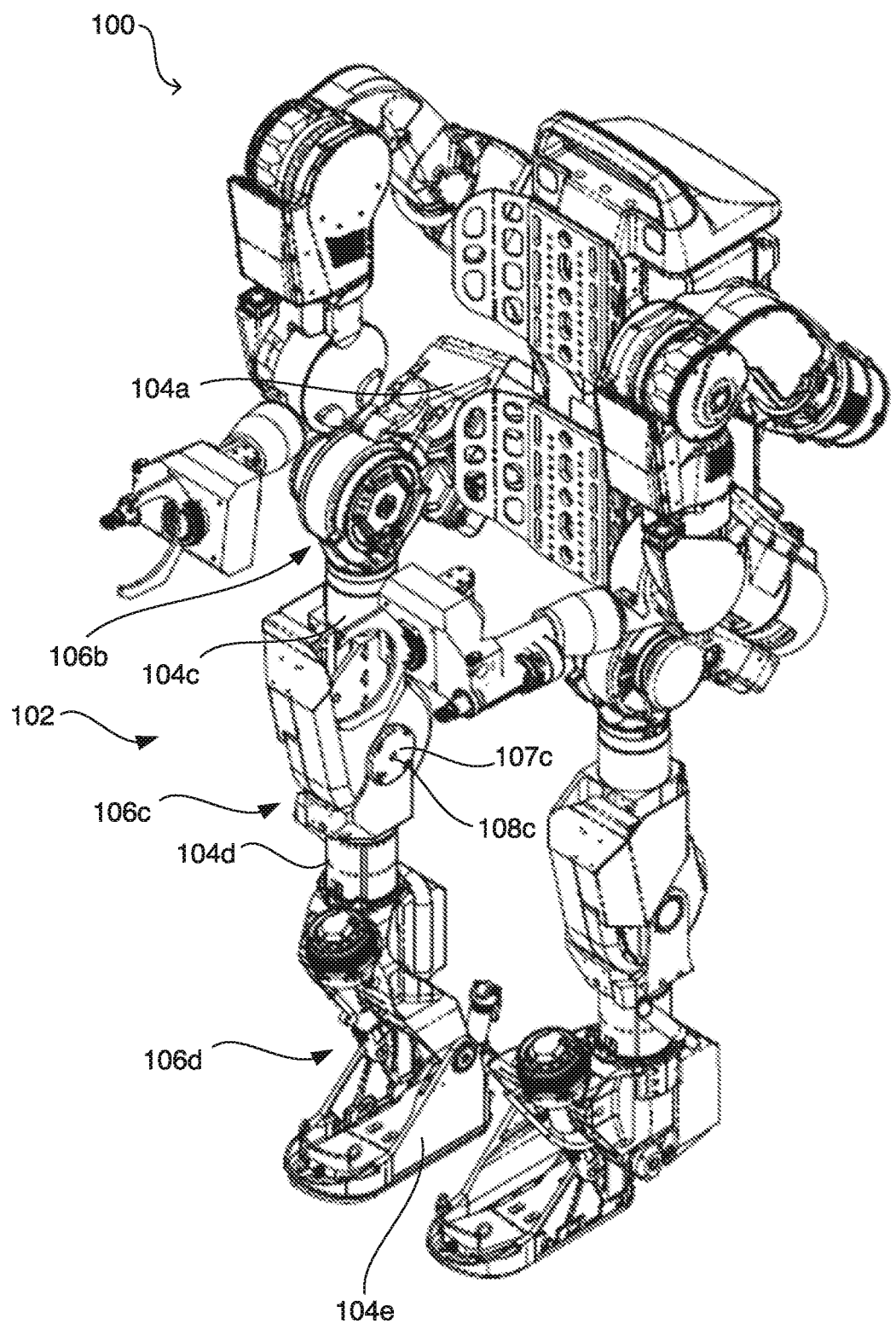
FIG. 2A is an isometric view of a robotic system, namely a wearable robotic exoskeleton, having at least one tunable actuator joint assembly in accordance with an example of the present disclosure.
Figure 2B:
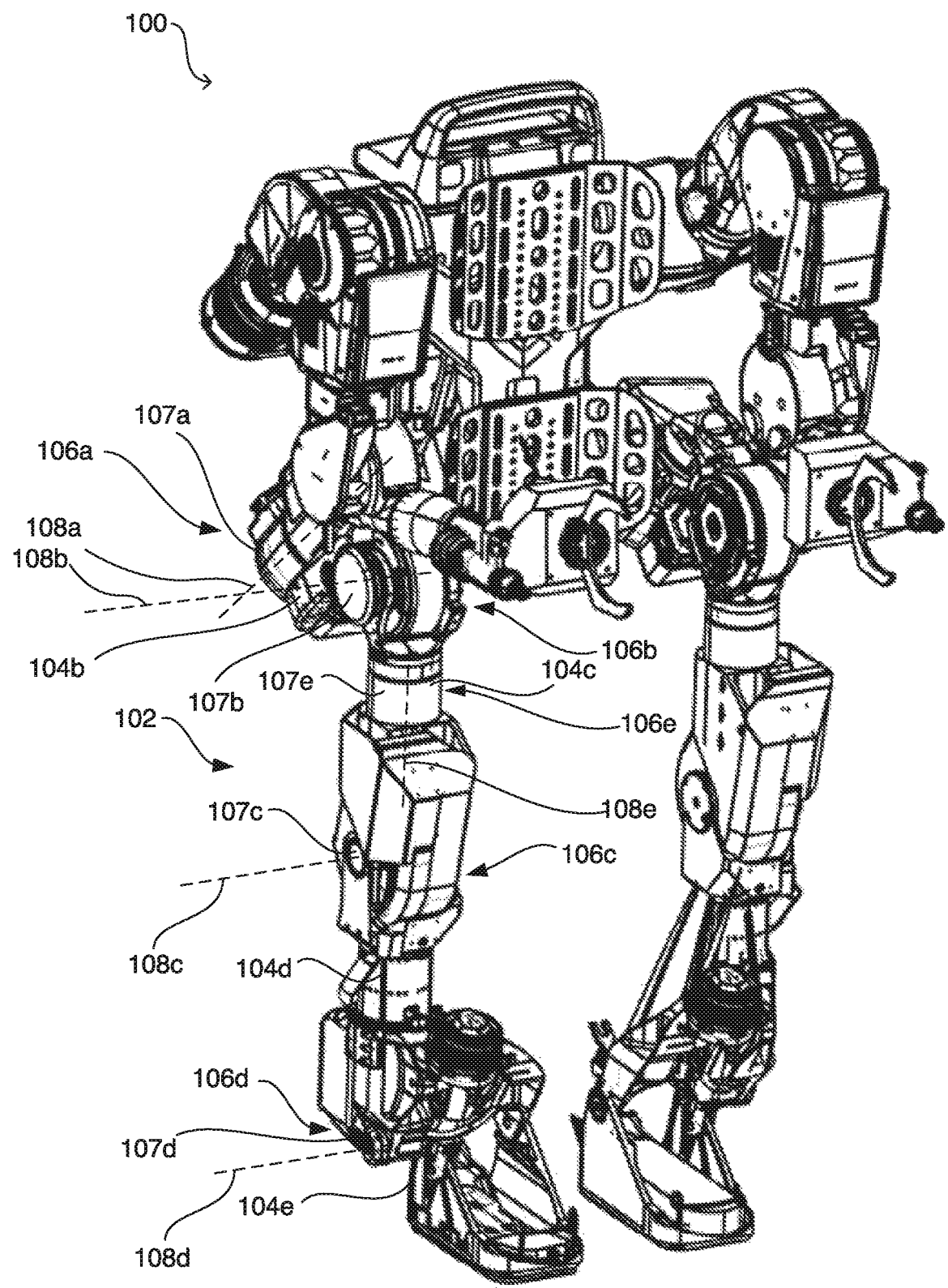
FIG. 2B is another isometric view of the robotic system of FIG. 2A.

One example of a robotic system 100 is generically and graphically illustrated in FIG. 1. FIGS. 2A and 2B illustrate the actual robotic system 100 having a plurality of tunable actuator joint assemblies, in accordance with an example of the present disclosure. With reference to FIGS. 1-2B, the robotic system 100 is shown in the form of an exoskeleton, and particularly a lower or lower body exoskeleton wearable by a user about the lower body. However, this is not intended to be limiting in any way as the concepts discussed herein can be applicable to and incorporated into or implemented with various types of robotic devices, such as exoskeletons (both upper and lower body exoskeletons (e.g., see FIGS. 2A and 2B)), humanoid robots or robotic devices, teleoperated robots or robotic devices, robotic arms, unmanned ground robots or robotic devices (e.g., legged robots or robotic devices), master/slave robots or robotic devices (including those operable with or within a virtual environment), and any other types of robots or robotic devices comprising one or more joints as will be apparent to those skilled in the art. In other words, with the robotic system 100 in the form of an exoskeleton as an example, the exoskeleton(s) as disclosed herein can be configured as a full-body exoskeleton (i.e., similar to the exoskeleton having both a lower body portion and upper body portion, see, for example, FIGS. 2A and 2B), or as only a lower body exoskeleton (e.g., some or all of the lower body portion of the exoskeleton of FIGS. 2A and 2B), or as only an upper body exoskeleton (e.g., some or all of the upper body portion of the exoskeleton of FIGS. 2A and 2B).

The robotic system 100 can comprise a one or more tunable actuator joint assemblies that provide for and facilitate movement of the robotic system 100 in one or more degrees of freedom. Some or all of the tunable actuator joint assemblies can comprise a quasi-passive linear pneumatic actuator.

By "joint assembly" it is meant a structure or assembly at a joint between two or more support members. The structure or assembly of the joint assembly is operable to connect or couple the two or more support members at the joint. The joint assembly can be configured to facilitate movement of the two or more support members relative to one another about one or more axes. Such movement can include translation and/or rotation of the two or more support members relative to one another in one or more degrees of freedom. The joint assembly can optionally comprise inputs and outputs connected to respective support members of the two or more members and can comprise additional linkages and/or one or more actuators connected to the inputs and outputs to rotate the two or members relative to one another.

A "joint" is defined as a place where two or more structural members are joined together. Structural members can be joined together at a joint, such that there is no relative movement between the members, or such that the members can move relative to one another in one or more degrees of freedoms.

A "tunable actuator joint assembly" comprises a joint assembly having a quasi-passive linear pneumatic actuator where the quasi-passive linear pneumatic actuator can be tuned to provide a desired force and/or stiffness profile at the joint assembly.

By "quasi-passive" it is meant that the quasi-passive linear pneumatic actuator can operate with more than one operating state (e.g., an active state and an inactive state, and in some cases a semi-active state), and that those states can be actively controlled, such as via a valve and associated valve assembly.

An "active state" refers to a state of operation of the quasi-passive linear pneumatic actuator where the quasi-passive linear pneumatic actuator can function as a gas spring that stores and releases spring-like energy (energy that increases with progressive displacement of the piston and compression of the fluid within the quasi-passive linear pneumatic actuator) as one form of a secondary torque upon relative rotation of support members connected at the joint of tunable actuator joint assembly. In one example, the quasi-passive linear pneumatic actuator can comprise a valve in a passageway connecting a compression chamber and an expansion chamber of the quasi-passive linear pneumatic actuator. In the active state, such a valve can be closed. In one example, gas can compress within the quasi-passive linear pneumatic actuator upon a first rotation of the support members connected at the joint in a first direction, thereby storing energy in the quasi-passive linear pneumatic actuator, and gas can expand within the quasi-passive linear pneumatic actuator upon a second rotation of the support members connected at the joint in a rotational direction opposite the rotational direction of the first rotation, thereby releasing energy from the quasi-passive linear pneumatic actuator, which energy release can be in the form of a secondary torque to cause rotation of the support members connected at the joint. In the active state, the release of energy upon rotation of the joint can facilitate an aggregate torque being applied to the joint, which comprises the secondary torque from the operation of the quasi-passive linear pneumatic actuator as combined with any primary torque from the primary actuator or actuation via human power.

An "inactive state" refers to the state of the quasi-passive linear pneumatic actuator where the quasi-passive linear pneumatic actuator does not function as a gas spring to apply a spring-like torque, but rather as a near constant force actuator. For example, the quasi-passive linear pneumatic actuator can comprise a valve in a passageway connecting a compression chamber and an expansion chamber of the quasi-passive linear pneumatic actuator. In the inactive state, such a valve can be open, such that the gas pressure in a housing of the quasi-passive linear pneumatic actuator is near equilibrium between both the compression chamber and expansion chamber. In the inactive state, the quasi-passive linear pneumatic actuator can behave as a constant force actuator, meaning that the quasi-passive linear pneumatic actuator outputs a force at a constant value, although those skilled in the art will understand that there will be deviations from a constant value resulting from losses in the system due to gas flow, friction, and heat transfer with the environment. As such, in the inactive state, energy can be stored and released, which type of energy is different from the spring-like energy stored and released in the active state (and partially in the semi-active state) in that it is energy from the near-constant force function of the quasi-passive actuator. Such energy can be applied at the joint as one form of a secondary torque, and this form of secondary torque can be applied in combination with a primary torque from a primary actuator to generate an aggregate torque that is applied at the joint.

A "semi-active state" refers to the state of the quasi-passive linear pneumatic actuator where the quasi-passive linear pneumatic actuator is partially activated to provide a partial spring-like storage and release of energy, and to function as a brake and/or damper. In this state, the valve associated with the quasi-passive pneumatic actuator can be partially open or modulated, depending upon the valve type, to store and dissipate energy upon a rotation of the support members connected at the joint. In one example, the quasi-passive linear pneumatic actuator can be operated to act as a brake and/or damper. In this case, the secondary torque output by the quasi-passive linear pneumatic actuator can act against (i.e., be applied in a different direction) a primary torque output by the primary actuator, the two combining to provide application of an aggregate torque at the joint, thus functioning to brake and/or dampen rotation of the support members connected at the joint. In another example, the quasi-passive linear pneumatic actuator can apply a secondary torque in the same rotational direction as the primary torque applied via the primary actuator, such that these are additive. In other words, the secondary torque from the quasi-passive linear pneumatic actuator and the primary torque from the primary actuator can be combined as an aggregate torque, and can be applied in the same direction to cause rotation of the support members connected at the joint.

The term "primary torque" refers to the torque generated from a primary actuator of a joint assembly. A primary actuator can comprise an electric motor such as a motor having a stator and a rotor that applies a torque to facilitate relative movement of the support members connected at a joint. The primary actuator can also comprise a transmission to direct the torque to facilitate relative movement of the support members connected at a joint. In another example, a primary torque can be generated via one or more movements by a user, which movements can operate to facilitate relative movement of the support members connected at a joint. The term "primary torque" refers to the torque from the primary actuator (or that produced via movements by a user) in any of the active, inactive and semi-active states.

The term "secondary torque" refers to the torque from the quasi-passive actuator (e.g., quasi-passive linear pneumatic actuator) in any of the active, inactive and semi-active states, which secondary torque is applied at the tunable actuator joint assembly to facilitate relative movement of the support members connected at the joint. In one example, the secondary torque can be applied in a manner such that it is additive and complements a primary torque applied by a primary actuator. In other words, the secondary torque from the quasi-passive actuator and the primary torque of the primary actuator each can be applied simultaneously in the same rotational direction. In another example, the secondary torque can be applied in a manner such that it is in opposition to the primary torque from the primary actuator. In other words, the secondary torque from the quasi-passive actuator and the torque of the primary actuator can be applied simultaneously in opposing rotational directions. For example, in one operational scenario, the secondary torque from the quasi-passive actuator may exceed the required torque currently needed or desired at the joint assembly. In this case, primary torque from the primary actuator can be applied to the joint assembly in a direction so as to oppose the secondary torque applied by the quasi-passive actuator in an amount so as to achieve the current required torque at the joint assembly. It is noted that a secondary torque can comprise torques from the quasi-passive actuator in any of the active, inactive and semi-active operational states. In another example operational scenario where the quasi-passive actuator returns energy (applies a torque/performs work) and the energy returned (i.e. work done by the quasi-passive actuator) exceeds the required work to operate the system, the primary actuator can be operated in a regenerative mode to apply the primary torque in opposition to the secondary torque, wherein the primary actuator returns energy to the primary supply and/or provide energy to operate other joints of the system.

The term "total torque" or "aggregate torque" refers to the combined torque of the primary actuator, the quasi-passive actuator, and in some instances a torque generated by the strength of a user of the exoskeleton system. As explained above, the total or aggregate torque can be the combined torque generated by the primary and quasi-passive actuator (i.e. the primary and secondary torques) where the primary and quasi-passive actuator apply a torque simultaneously in the same rotational direction or in opposing rotational directions. An aggregate torque can be applied in any of the active, inactive and semi-active operational states.

The upper extremity quasi-passive linear pneumatic actuators can have a different configuration and/or function from the lower extremity quasi-passive linear pneumatic actuators, or they can comprise the same or a similar configuration and function. For example, with respect to functionality, the lower extremity quasi-passive linear pneumatic actuators can provide an energy storage and recovery mechanism and function during a portion of cyclic motions, such as during a portion of a walking or running gait cycle, and an ability to swing freely during other parts of the gait cycle or for other activities. Upper extremity quasi-passive linear pneumatic actuators can provide an energy recovery mechanism and function, such as for gravity compensation when the upper extremities are in support of a load, such as cargo, armor, weapon masses, or any other load carried by the robotic system 100. In both cases, the quasi-passive linear pneumatic actuators function to reduce the demand on the power supply, and on the primary actuators that may be used to do work in parallel with the quasi-passive linear pneumatic actuators, as well as to improve the overall efficiency of the robotic system 100 compared to a similar robotic system without the benefit of one or more quasi-passive linear pneumatic actuators. It is noted that, in example robotic systems, such as those described herein, the types of quasi-passive actuators used at the different joints and within the associated tunable actuator joint assemblies can be the same or different. Using the example of the robotic system 100, the same or different quasi-passive linear pneumatic actuators can be used in the various tunable actuator joint assemblies within the upper and lower extremities of the robotic system 100, or in the various tunable actuator joint assemblies within the upper extremity (the same being the case with the lower extremity), or in the various tunable actuator joint assemblies within the same limb.

The example actuators described herein can be referred to as quasi-passive linear pneumatic actuators as they are controllable and operable in active and inactive states or modes of operation (as compared to being entirely passive actuators (e.g., a simple spring) that are always either storing energy or releasing energy during all rotational movements of support members connected at an associated joint, or other movements of a mechanical system). In examples discussed herein, the active, semi-active, and inactive modes or states of operation can be selectable or controllable (e.g., selectable at a time prior to operation of the robotic system and a particular joint), and in some examples dynamically selectable or controllable (e.g., selectable and controllable in real-time), as well as being able to be repeatedly switched from one state or mode to another state or mode, during operation of the robotic system. Depending upon the configuration of the tunable actuator joint assembly, example quasi-passive linear pneumatic actuators can comprise a first active state in which the quasi-passive linear pneumatic actuator can be actuated to store and release spring-like energy during various rotations of support members connected at a joint of the robotic system, including actuation of the quasi-passive linear pneumatic actuator to store and release energy at select positions of a joint, a second inactive state in which the quasi-passive linear pneumatic actuator can be made inactive, such that energy is stored and released not in a spring-like manner or function, but rather in a near constant force actuator manner or function (the quasi-passive linear pneumatic actuator can behave as a constant force actuator to apply a residual biasing force to the joint assembly, as discussed herein) during various rotations of support members connected at the joint, and in some cases, depending upon the type and/or configuration of the valve assembly used to control the quasi-passive linear pneumatic actuator, a third semi-active or partially active state in which the quasi-passive linear pneumatic actuator can be partially actuated (or can be actuated via pulse width modulation to simulate being partially actuated) to store and release some degree of spring-like energy (e.g., a smaller magnitude of energy than that stored and released with the quasi-passive linear pneumatic actuator in the active state) during various rotations of support members connected at the joint. In some example robotic systems, the quasi-passive linear pneumatic actuator(s) can be switchable in real-time between the different modes or states of operation as needed or desired depending on, for example, needed or desired tasks and corresponding rotation movements, various torque or load requirements at the one or more joints of the robotic system, or needed or desired braking forces. As can be seen, each of the active, inactive and semi-active states are operable to provide some degree of torque to the joint assembly, which torque can be combined with the torque from the primary actuator (or that provided by an operator or user).

In some examples, the robotic system 100 can comprise an upper exoskeleton and a lower exoskeleton, each having left and right exoskeleton limbs. With reference to the lower exoskeleton limb 102 as an example, the exoskeleton limb 102 can comprise a plurality of rotatably coupled support members 104a-d that are each part of one or more joint systems, and that are rotatable via one or more joint assemblies (i.e., a support member can be part of more than one joint system). Some of the joint assemblies may or may not comprise a tunable actuator joint assembly having a quasi-passive linear pneumatic actuator. Indeed, some of the joint assemblies can comprise a powered joint without a quasi-passive actuator. In other examples, the actuator joint assembly can comprise an unpowered or passive joint assembly (devoid of a primary actuator, and moveable by a force applied by a human), with or without a quasi-passive linear pneumatic actuator. The support members 104a-d can each comprise a single rigid structural support or a collection of rigid, structural supports, that are directly or indirectly coupled together, that extend(s) from a joint or that extend(s) between two joints within the limb 102 of the exoskeleton, or that link the joints together, much like the bones in the human body extending from or between various joints. The support members 104a-d can be respectively coupled together for relative movement via respective joints, such as the joints provided by the tunable actuator joint assemblies 106a-d, each of these defining and providing a degree of freedom about a respective axis of rotation 108a-d. The rotational degrees of freedom about the axes of rotation 108a-d can correspond to one or more degrees of freedom of the human leg. For example, the rotational degrees of freedom about the axes 108a-d can correspond, respectively, to hip abduction/adduction, hip flexion/extension, knee flexion/extension, and ankle flexion/extension. Although not shown in FIG. 1 other leg degrees of freedom can be added, including, for example, hip rotation, ankle rotation and ankle inversion/eversion. Similarly, although not shown, degrees of freedom about respective axes of rotation within an upper body exoskeleton can correspond to one or more degrees of freedom of a human arm. For example, the degrees of freedom about the axes of rotation in an upper body exoskeleton limb can correspond to shoulder abduction/adduction, shoulder flexion/extension, shoulder medial/lateral rotation, elbow flexion/extension, wrist pronation/supination, and wrist flexion/extension. A degree of freedom corresponding to wrist abduction/adduction can also be included, as desired.

A human user or operator may use or interact with the exoskeleton robotic system 100 by interfacing with the robotic system 100. This can be accomplished in a variety of ways. For example, an operator may interface with the robotic system 100 by placing his or her foot into a foot portion of the assembly, where the foot of the operator can be in contact with a corresponding force sensor. Portions of the human operator can also be in contact with other force sensors of the exoskeleton robotic system 100 located at various locations of the robotic system 100. For example, a hip portion of the robotic system 100 can have one or more force sensors configured to interact with the operator's hip. The operator can be coupled to the robotic system 100 by various straps or other appropriate coupling devices. The operator can be further coupled to the robotic system 100 by a foot strap or other securing mechanism. In one aspect, various position and/or force sensors can be located about a hip, knee and/or ankle portion of the robotic system 100, configured to interface with and be acted upon by the operator. While reference is made to sensors disposed at specific locations on or about the robotic system 100, it should be understood that position or force sensors, or both, or other types of sensors as will be appreciated by those skilled in the art, can be strategically placed at numerous locations on or about the robotic system 100 in order to facilitate proper operation of the robotic system 100.

As a general overview, tunable actuator joint assemblies 106a-d can be associated with various degrees of freedom of the exoskeleton-type robotic system 100 to provide forces or torques to the support members in the respective degrees of freedom. Unlike traditional exoskeleton systems and devices, the robotic system 100 can be configured, such that one or more tunable actuator joint assemblies are configured to recover energy at select times during operation of the robotic system 100, which can reduce complexity and power consumption of the robotic system 100, as well as allow for reduced size of primary actuators to be used as compared with a tunable actuator joint assembly without a quasi-passive linear pneumatic actuator as disclosed herein. In one example, the quasi-passive linear pneumatic actuator of the tunable actuator joint assembly 106c, which defines a degree of freedom corresponding to a degree of freedom of knee flexion/extension, can be operated at select times to switch between the active and inactive states during a gait cycle (e.g., a walking gait cycle). By appropriately switching the quasi-passive linear pneumatic actuator from an active state during the stance phase to an inactive state during the swing phase, the tunable actuator joint assembly 106c can be operated with more energy saved and with more efficiency than with the quasi-passive linear pneumatic actuator of the tunable actuator joint assembly 106c maintained in the active state during the entire gait cycle. Indeed, with a quasi-passive actuator (e.g., the quasi-passive linear pneumatic actuator of the tunable actuator joint assembly 106c) operating in an active state to store and release energy during a first gait movement (between heel strike and toe off) and then switched to operate in the inactive state to store and release a lesser amount of energy during a second gait movement (at toe off and during swing phase), torque can be applied at the joint, or more specifically torque can be applied to one or more components making up the joint assembly (e.g., the output member), to rotate support members connected at the joint of the tunable actuator joint assembly 106c that facilitates knee flexion/extension. In another example, as alluded to above, the quasi-passive linear pneumatic actuator of the tunable actuator joint assembly 106c can be configured to be maintained in the active state during the entirety of same gait cycle. In this case, energy can be stored and released during both the stance phase (heel strike to toe off) and the swing phase (toe off to heel strike) as the support members connected at the joint are caused to rotate in various directions during the gait cycle. Although maintaining the quasi-passive linear pneumatic actuator in the active state during the duration of the gait cycle is not as efficient as actively switching the states of the quasi-passive linear pneumatic actuator during select times of the gait cycle, this is more efficient than a similar robotic system would be without a quasi-passive linear pneumatic actuator associated with the joint. Specifically, the gait cycle of the exoskeleton type robotic system 100 is made more efficient as compared to a similar robotic system without a quasi-passive linear pneumatic actuator as energy is able to be stored and released at select and precise moments during the gait cycle. Additional tunable actuator joint assemblies 106b and 106d combined with the tunable actuator joint assembly 106c can still further increase the efficiency of the robotic system 100 by storing and releasing energy at precise and select times during rotation of support members at their respective joints 107b and 107d. The tunable actuator joint assembly 106c can also be configured with the quasi-passive actuator operable to store energy during a squatting or other motion causing a lowering of the exoskeleton. The tunable actuator joint assembly 106c and its quasi-passive linear pneumatic actuator can be dynamically tuned (i.e., tuned in real time) to comprise different operating capabilities depending upon the type of motion to be performed by the exoskeleton.

In one aspect, the torque from the quasi-passive linear pneumatic actuator of the tunable actuator joint assembly 106c can be termed a secondary torque that combines with the primary torque generated by a primary actuator of the tunable actuator joint assembly 106c to produce an aggregate torque operable to facilitate rotation of the support members 104c, 104d connected at the joint 106c about the degree of freedom 108c. In one example, the aggregate torque can comprise the combined torque from the quasi-passive linear pneumatic actuator (secondary torque) applied in parallel with and in the same rotational direction (i.e., the torques can be additive) as the primary torque. In this example, the secondary torque from the quasi-passive linear pneumatic actuator can operate to assist the primary actuator to rotate support members 104c, 104d connected at the joint of the joint system and the tunable actuator joint assembly 106c in the same direction, as discussed in more detail below. In other examples, the aggregate torque can comprise the combined torque from the quasi-passive linear pneumatic actuator (secondary torque) applied with, but in opposition to, the primary torque, as further discussed herein.

The tunable actuator joint assembly 106c can be selectively controlled during and to manage rotation of support members 104c, 104d connected at the joint 107c, wherein the quasi-passive linear pneumatic actuator can be engaged to operate (i.e., caused to enter an active operating state or condition in which the quasi-passive linear pneumatic actuator is operable and enabled to store and release spring-like energy, or caused to enter an inactive operating state in which the quasi-passive linear pneumatic actuator is operable and enabled to function as a near constant force spring, or caused to enter a semi-active operating state to provide at least some degree of spring-like storage and release of energy, depending upon the type and/or configuration of the valve assembly controlling the quasi-passive linear pneumatic actuator)). To be clear, in the inactive state, the quasi-passive linear pneumatic actuator is disengaged from providing spring-like storage and release of energy, and instead operates to store and release energy in a near constant force actuator manner) during rotation of support members at the joint. In the inactive state, this can facilitate the "free swing" of the joint with reduced or negligible resistance to the rotation of the support members connected at the joint as the operator walks or runs, for instance. On the other hand, by operating in parallel with the primary actuator (e.g., actuation of a primary motor operable to actuate the joint), the quasi-passive linear pneumatic actuator can provide or apply a torque in parallel with and in the same rotational direction as the torque provided by the primary actuator (i.e., a torque that is added to the torque generated by the primary actuator). In some examples depending on the motion or operation, the quasi-passive linear pneumatic actuator can apply a torque that works with a torque provided by the primary actuator (i.e. the torques provided by the quasi-passive linear pneumatic actuator and the primary actuator are applied in the same direction), and in other examples the quasi-passive linear pneumatic actuator can apply a torque that works against a torque provided by the primary actuator (i.e. the torques provided by the quasi-passive linear pneumatic actuator and the primary actuator can be applied in different directions). In some examples, such as when the quasi-passive linear pneumatic actuator acts in a semi-active state, the quasi-passive linear pneumatic actuator can apply a braking force to the joint assembly, such as by operating as a damper.

The quasi-passive linear pneumatic actuator of the tunable actuator joint assembly 106c can comprise a compact internal valve that can be controlled and operated to change the states or modes of the quasi-passive linear pneumatic actuator, namely to switch between an active state (where the actuator acts as a spring for transient energy storage and recovery), and an inactive state (where the quasi-passive linear pneumatic actuator does not store or release energy in a spring-like manner, but instead employs a shunting function that allows the quasi-passive linear pneumatic actuator (e.g., a piston and piston in a linear pneumatic type of actuator) to move while producing a near constant and reduced biasing force via the fluid moving freely and at near equilibrium pressure between the compression and expansion chambers within the quasi-passive linear pneumatic actuator and the valve assembly upon movement or rotation of the support members connected at the joint, except for friction and movement of fluid through the valve assembly and/or for a residual biasing force that can be configured with the quasi-passive linear pneumatic actuator, as will discussed below). Depending upon the type and configuration of the valve, the quasi-passive linear pneumatic actuator can also be switched into a semi-active state by partially opening the valve (or by actuating the valve using pulse-width modulation). Moreover, the tunable actuator joint assembly 106c can be "tuned" to comprise a desired stiffness, as further discussed below. Thus, the magnitude of stiffness for a given joint is adjustable or variable for mission or task specific payloads and terrain-specific gaits while the active valve controls exactly when that stiffness is activated and engaged for energy storage and recovery, and when it is inactive and disengaged to enable free or low force movement within the quasi-passive linear pneumatic actuator and to facilitate free swing of the associated joint and joint system. The result is effectively a quasi-passive mechanism that, in one advantage, is selectively operable to recover energy (e.g., energy lost during some motions of the associated joint and joint system), and to reduce or minimize power consumption required to actuate the joint and joint system. Stated differently, one advantage of the technology described herein is to operate the quasi-passive actuator in a way that minimizes the power and power losses required to operate the primary actuator. Therefore, when combining a plurality of tunable actuator joint assemblies within the robotic system 100, such as the exoskeleton shown, for example, a significant amount of energy can be recovered and utilized during movement via respective robotic joint systems, such as those corresponding to shoulder, elbow, wrist, hip, knee, and ankle joints of a human, which can reduce weight, size, complexity, and overall power consumption of the robotic system 100.

As indicated above, the robotic system 100 can comprise various exoskeleton limbs as part of the full body exoskeleton shown. The full body exoskeleton can comprise an upper body exoskeleton portion and a lower body exoskeleton portion operable with the upper body exoskeleton portion, with each portion comprising one or more degrees of freedom of movement facilitated by one or more joint assemblies, including one or more tunable actuator joint assemblies having a quasi-passive linear pneumatic actuator. Each of the upper and lower body exoskeleton portions can comprise left and right exoskeleton limbs. For example, the right exoskeleton limb 102, which is part of the lower body exoskeleton portion, can comprise a plurality of lower body support members 104a-e and joints 107a-d. The support members 104a-d can be coupled together as shown for relative movement about a plurality of respective joints 107a-d defining a plurality of degrees of freedom about respective axes of rotation. The right exoskeleton limb 102 can comprise a plurality of tunable actuator joint assemblies (e.g., see tunable actuator joint assemblies 106a, 106b, 106c and 106d) defining and providing at least some of the respective joints 107a-d. In some robotic system configurations, the tunable actuator joint assemblies having quasi-passive actuators can be combined with joint assemblies that do not have or possess a quasi-passive actuator, or a primary actuator, or both. For example, the right lower exoskeleton limb 102 shown can comprise a joint assembly 106c having a joint 107c that facilitates rotation of support members 104c, 104d about an axis of rotation 108c, which corresponds to flexion/extension rotational degree of freedom of a knee of a human. In one example, the joint assembly 106c can comprise an actuator. In another example, the joint assembly 106c can be a completely passive joint without an actuator that is rotated under the power of the operator. In both of these examples, the joint assembly 106c can be configured without a quasi-passive actuator. However, it is noted that the joint assembly 106c can, in another example, comprise a quasi-passive linear pneumatic actuator, and thus be considered a tunable actuator joint assembly. Indeed, in this example, the quasi-passive linear pneumatic actuator can be implemented or incorporated into the joint assembly 106c to store and release energy in an active state, and/or to provide a biasing function that biases the joint assembly 106c (and thus support members 104c and 104d) to a default rotational position in an inactive state similar to other joint systems discussed herein. In the active state, the quasi-passive linear pneumatic actuator can be configured to function as a spring to store and release energy upon rotation of the support members 104c and 104d about the joint 107c (e.g., by the user, via a primary actuator of the joint assembly 106f, or by gravity induced rotation), which in turn causes the quasi-passive linear pneumatic actuator to apply a torque to support members 104c and 104d about the joint 107c to rotate the support members 104c and 104d about the joint 107c as discussed herein. Alternatively, as the quasi-passive linear pneumatic actuator can be configured with a default inactive state where it behaves as a constant force actuator (i.e., the valve assembly controlling the quasi-passive linear pneumatic actuator having a default open position), the quasi-passive linear pneumatic actuator, and therefore the support members 104c and 104d about joint 107c, can be biased to the default position due to the difference in forces acting on both sides of the piston of the quasi-passive linear pneumatic actuator, as explained in more detail below with respect to the tunable actuator joint assembly 106c.

Each joint system can comprise a joint assembly, and each joint assembly can comprise a joint. In other words, one or more of the joints 107a-e can be part of one of the respective joint assemblies 106a-e, or the joint assemblies 106a-e can comprise one or more of the joints 107a-e. As indicated, a joint assembly can comprise a tunable actuator joint assembly having a quasi-passive linear pneumatic actuator in one example, while in another example a joint assembly can comprise an actuator joint assembly without a quasi-passive linear pneumatic actuator and/or a primary actuator. As one example, the right limb 102 of the exoskeleton shown can comprise the tunable actuator joint assembly 106c, which can comprise and define the right knee joint 107c operable to facilitate movement of the robotic system 100 in a degree of freedom corresponding to a knee flex/extend degree of freedom in a human. The tunable actuator joint assembly 106c can comprise a quasi-passive linear pneumatic actuator, as described herein. In another example, the right limb 102 of the exoskeleton shown can comprise the tunable actuator joint assembly 106a, which can comprise and define the hip joint 107a operable to facilitate movement of the robotic system 100 in a degree of freedom corresponding to a hip abduction/adduction degree of freedom of a human. The tunable actuator joint assembly 106a can comprise a quasi-passive linear pneumatic actuator, as described herein. In still another example, the right limb 102 of the exoskeleton shown can comprise the tunable actuator joint assembly 106b, which can comprise and define the hip joint 107b operable to facilitate movement of the robotic system 100 in a degree of freedom corresponding to a hip flex/extend degree of freedom of a human. The tunable actuator joint assembly 106b can comprise a quasi-passive linear pneumatic actuator, as described herein. In still another example, the right limb 102 of the exoskeleton shown can comprise the tunable actuator joint assembly 106d, which can comprise and define the ankle joint 107d operable to facilitate movement of the robotic system 100 in a degree of freedom corresponding to an ankle flex/extend degree of freedom of a human. The tunable actuator joint assembly 106d can comprise a quasi-passive linear pneumatic actuator, as described herein.

It will be appreciated, although not detailed herein, that the robotic system 100 can comprise other joint systems having respective joint assemblies and joints. For example, the exoskeleton shown can comprise other joints, such as joints of the lower left extremity and joints of the upper left and right extremities of the exoskeleton, each of which can be part of respective joint assemblies or tunable actuator joint assemblies, and each of which can define and provide a degree of freedom about a respective axis of rotation. Moreover, some of these other joint assemblies can comprise tunable actuator joint assemblies having a quasi-passive linear pneumatic actuator, as described herein. For example, it will be apparent to those skilled in the art that the various degrees of freedom about various axes of rotation in the upper body exoskeleton of the robotic system 100 can correspond to shoulder abduction/adduction, shoulder flexion/extension, shoulder medial/lateral rotation, elbow flexion/extension, wrist pronation/supination, and wrist flexion/extension. A degree of freedom corresponding to wrist abduction/adduction can also be included, as desired. Similarly, the various degrees of freedom about various axes of rotation in the lower body exoskeleton of the robotic system 100 can correspond to hip abduction/adduction, hip flexion/extension, knee flexion/extension, ankle medial/lateral rotation, and ankle flexion/extension. Each of these degrees of freedom and their axes of rotation can be provided by a joint assembly (which can comprise in any of these a tunable actuator joint assembly) operable with respective support members rotatable relative to one another via a joint of the respective joint assembly as part of a respective joint system, as discussed herein.

Figure 3C:
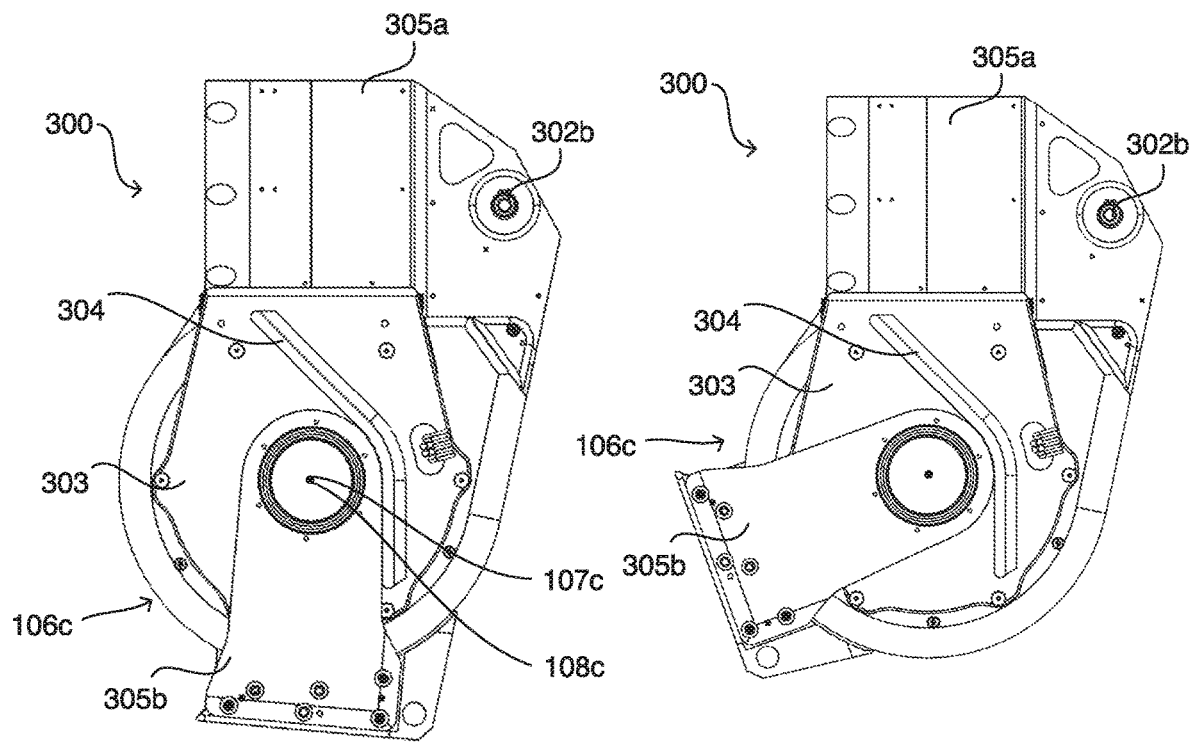
FIG. 3C is a side view of the robotic joint system of FIG. 3A, with the support members shown in a flexed position.
Figure 3C:
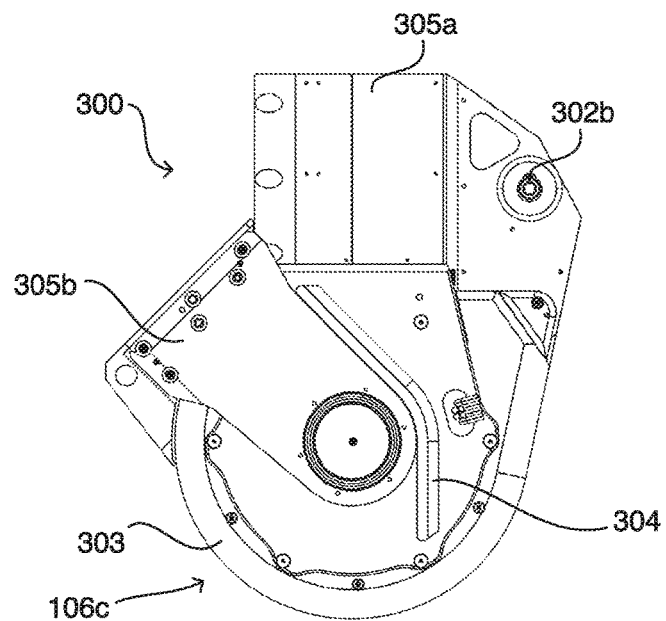
Figures 4A, 4B:
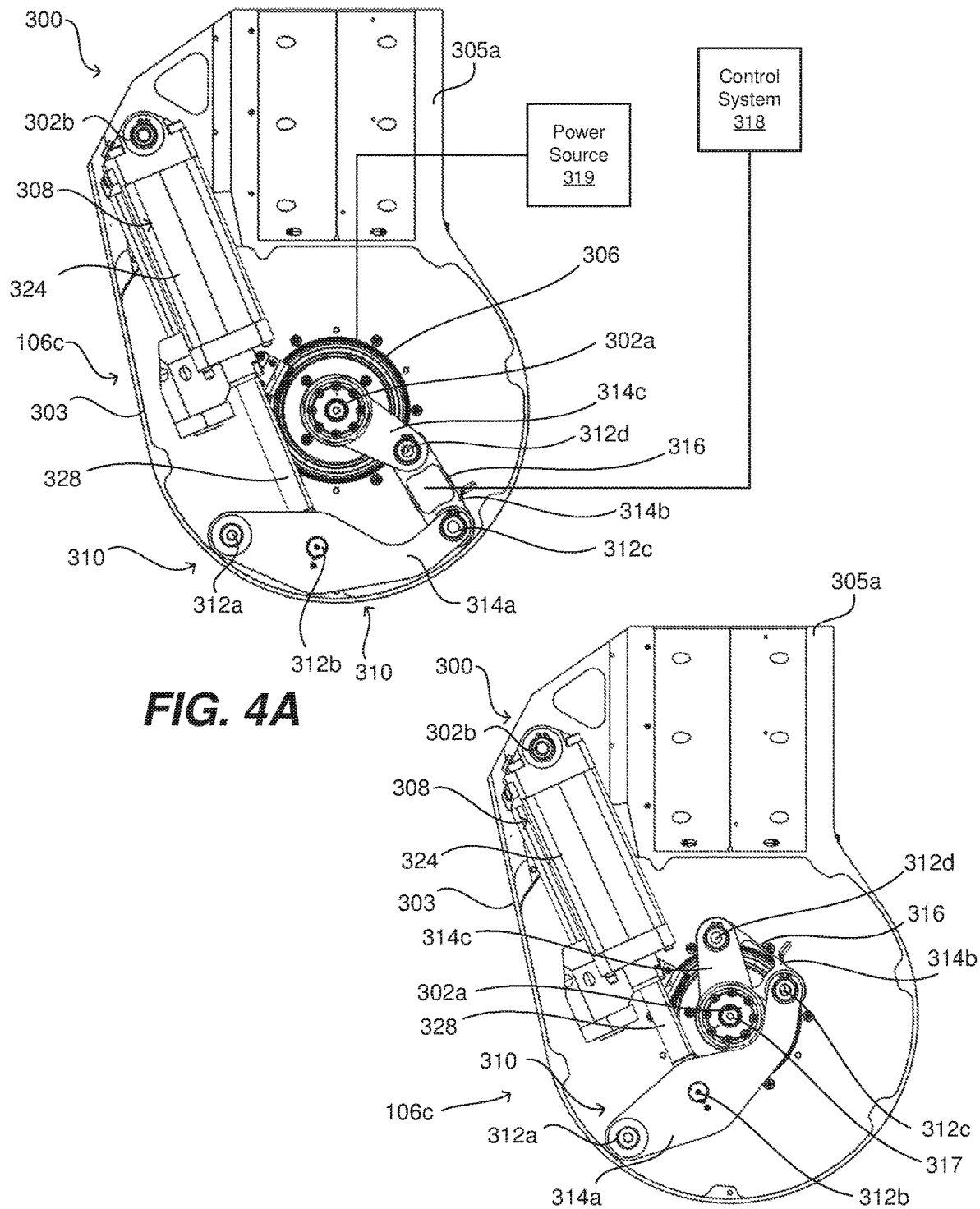
FIG. 4A illustrates a side view of the robotic joint system of FIG. 3A with a panel of the housing removed to show internal features and components of the robotic joint system, the robotic joint system being shown in an extended position.
FIG. 4B illustrates a side view of the robotic joint system of FIG. 3A with a panel of the housing removed to show internal features and components of the robotic joint system, the robotic joint system being shown in a retracted position.

FIGS. 3A-3C illustrate side views of a joint system 300 comprising the first and second support members 305a and 305b and the tunable actuator joint assembly 106c of the robotic system 100 of FIGS. 1-2B, in various rotational positions or orientations. FIGS. 4A and 4B illustrate side views of the joint system 300 of FIGS. 3A-3C with a panel of the housing removed to show internal features of the tunable actuator joint assembly 106c. With reference to FIGS. 1A-4B, the joint system 300 can comprise the tunable actuator joint assembly 106c and first and second support members 305a and 305b connected to the tunable actuator joint assembly 106c. The support members 305a and 305b rotate relative to one another about the axis of rotation 108c of the joint 107c, in accordance with an example of the present disclosure. The tunable actuator joint assembly 106c can be incorporated into a robotic or robot limb, such as into the lower right limb of the exoskeleton type robotic system 100 (see FIGS. 1-2B). The tunable actuator joint assembly 106c, as discussed herein, provides one example of a tunable actuator joint assembly that can be used in any of the joints of the robotic exoskeleton 100. Generally speaking, a tunable actuator joint assembly configured in accordance with the disclosure herein can facilitate movement of the robotic system in a degree of freedom, namely rotation between rotatably coupled support members of a robot or robotic system that are operable with the tunable actuator joint assembly, and can comprise and define a joint between the support members. Any of the tunable actuator joint assemblies herein can include various linkages, connectors and/or actuators to enable the tunable actuator joint assembly to facilitate a desired movement between the rotatably coupled support members of the joint system.

The example joint system 300 with its tunable actuator joint assembly 106c can comprise a knee joint 107c and can facilitate a flexion/extension degree of freedom in the robotic system 100 corresponding to a knee flexion/extension degree of freedom of a human, as discussed above. The knee joint 107c can comprise an axis of rotation 108c. The tunable actuator joint assembly 106c can further comprise a primary actuator 306 operable to apply a primary torque at the joint 107c, such as to cause rotation between the support members and flexion/extension in the limb 102 via the joint assembly 106c at the joint 107c.

The joint system 300 can further comprise a first support member 305a and a second support member 305b operable with the tunable actuator joint assembly 106c to define and provide the joint 107c, wherein the first and second support members 305a and 305b and the tunable actuator joint assembly 106c are configured, such that the first and second support members 305a and 305b are able to rotate relative to one another about the axis of rotation 108c to facilitate the flex/extend motion of the joint system 300. The first support member 305a can comprise a rigid limb component that can be configured in any number of ways as will be apparent to those skilled in the art. The second support member 305b can also comprise a rigid limb component that can be configured in any number of ways as will be apparent to those skilled in the art, wherein these are configured to be rotatable relative to one another about the associated joint 107c. The joint assembly 106c can facilitate movement between the first support member 305a and the second support member 305b in a flex/extend motion about the axis of rotation 108c. In the example shown, the joint assembly 106c can rotate the second support member 305b relative to the first support member 305a from a fully extended position, as shown in FIG. 3A, to an intermediate position, as shown in FIG. 3B, to a fully flexed position, as shown in FIG. 3C.

The tunable actuator joint assembly 106c can comprise an output member 302a (see FIGS. 4A and 4B) and an input member 302b that are operable with the second support member 305b and the first support member 305a, respectively, and that can facilitate rotation of the first support member 305a relative to the second support member 305b about the axis of rotation 108c. The output member 302a can be part of or coupled to the primary actuator 306 (which in this example, comprises an electric motor having an output shaft, but in another example can comprise a motor and one or more transmissions, in which the output member 302a can be coupled to the one or more transmissions). The output member 302a can further be coupled to the second support member 305b. The input member 302b can comprise the coupling of the quasi-passive linear pneumatic actuator to the first support member 305a using various coupling components (e.g., a pin on the first support member 305a that extends through an aperture in the quasi-passive linear pneumatic actuator, and that is secured using a bearing). The input member 302b can be part of or coupled to the first support member 305a, wherein the first and second support members 305a and 305b are rotatable relative to one another via the input and output members 302b and 302a, respectively. The relative rotation of the first and second support members 305a and 305b via the input and output members 302b and 302a, respectively, can be referred to generally as rotation of the joint system 300.

The tunable actuator joint assembly 106c can comprise a primary actuator 306 (e.g., an electric motor, electromagnetic motor, an electric motor and a transmission combination, or others as will be apparent to those skilled in the art) operable to apply a primary torque to the joint system 300. In this example, the primary actuator 306 comprises an electric motor that operates to apply the primary torque to the output member 302a, and the second support member 305b coupled thereto, to cause the second support member 305b to rotate relative to the first support member 305a about the axis of rotation 108c (or the torque can be applied to resist rotation of the joint, such as in the case of gravity-induced rotation of the joint). The primary actuator 306 can be selectively controlled, or in other words, selectively energized, and therefore, the primary torque applied to rotate the joint system 300 can be selectively controlled. Selective control of the primary actuator 306 can include, but is not limited to, control of the timing of the energizing of the primary actuator 306 (i.e., when the primary actuator 306 is turned on and off), the duration of the energization of the primary actuator 306 (i.e., how long the primary actuator 306 is on or off), as well as the magnitude of the force/torque output at a given speed produced by the primary actuator 306 (i.e., the level of power output by the primary actuator 306).

As indicated above, the tunable actuator joint assembly 106c can further comprise a quasi-passive linear pneumatic actuator operable to store energy and release energy into the joint system 300 via the tunable actuator joint assembly 106c, which quasi-passive linear pneumatic actuator 308 is maintained in continuous operation with the primary actuator 306 during any rotation of the joint system 300 (e.g., its operation is not at any time decoupled from the output member of the primary actuator 306 or operation of the actuator joint assembly and the overall joint system associated therewith). In the example shown, the tunable actuator joint assembly 106c comprises a quasi-passive linear pneumatic actuator 308 that operates in parallel with the primary actuator 306. The quasi-passive linear pneumatic actuator 308 can be selectively controlled, and caused to be placed into various operating states. In one example, in an active state, quasi-passive linear pneumatic actuator 308 can be caused to store spring-like energy upon a first rotation or movement of the input member 302b and the first support member 305a relative to the output member 302a and the second support member 305b (e.g., which first rotation can produce a movement in the direction of gravity), and to release energy upon a second rotation of the first member 305a relative to the second member 305b (which second rotation can be in an opposite direction). The released energy from the quasi-passive linear pneumatic actuator 308 can be sufficient to apply a torque to the joint system 300 sufficient to cause rotation of the joint system 300 (i.e. rotation of the first member 305 relative to the second member 305b about the joint 107c). This torque can be referred to as a secondary torque which can be combined with the primary torque from the primary actuator 306 to produce an aggregate torque operable to assist rotation of the output member 302a in the second direction, which direction is opposite than the direction in which the energy was stored within the quasi-passive linear pneumatic actuator 308. In a semi-active state, the quasi-passive linear pneumatic actuator 308 can be controlled to apply a torque to the joint system 300 that works against a torque applied by the primary actuator 306, namely to store energy upon rotation or movement of the input member 302b and the first support member 305a relative to the output member 302a and the second support member 305b and to dissipate a portion of the stored energy, such as during continued rotation of the first support member 305a relative to the second support member 305b about the joint 107c, wherein the quasi-passive linear pneumatic actuator 308 functions to provide a damping and/or braking force to the joint system 300 (with the valve in a semi-active state). In this state, the quasi-passive linear pneumatic actuator 308 can operate to apply a torque sufficient to cause rotation of the joint system 300, which can work against the torque from the primary actuator 306 to assist in braking the rotation of the joint system 300, which can include the output member 302a. In some cases, the quasi-passive linear pneumatic actuator 308 can be operable to provide a compensation torque that acts against a gravitational force acting on the joint system 300. For example, in the inactive state, the quasi-passive linear pneumatic actuator 308 can be caused to produce a near constant restoring force (e.g., in the case of a knee joint it can assist the joint to get in a fully extended pose), again as it is at all times coupled to the output member of the primary actuator 306.

It is noted that, in some examples, when the secondary torque produced by the quasi-passive actuator exceeds the total required torque at the joint, the primary actuator can be operated to produce a primary torque that opposes the secondary torque produced by the quasi-passive actuator. The combined torque from the quasi-passive actuator and the primary actuator (the combination of the primary and secondary torques) can still be referred to as an aggregate torque in this situation as the primary torque from the primary actuator and the secondary torque from the quasi-passive actuator add up to the total torque required at the joint (except for losses such as friction). The primary and quasi-passive actuator torques (primary and secondary torques) may oppose each other in certain situations in all operating states of the quasi-passive actuator, namely the active, inactive and semi-active operating states discussed herein. It is further noted that, in all cases of the present technology, operation of the quasi-passive actuator can be selective, so as to minimize the power and power losses required to operate the primary actuator to effectuate the required or desired rotation of the support members connected at the joint.

In some examples, the torque from the quasi-passive linear pneumatic actuator 308 can be utilized to minimize power consumption of the primary actuator 306 (thus leading to the ability to select a smaller, less powerful motor than might otherwise be needed without the existence of the quasi-passive linear pneumatic actuator). For example, the quasi-passive linear pneumatic actuator 308 can be utilized to store energy in the event the joint 107c is subject to forces that cause the support members 305a and 305b connected at the joint 107c to rotate in a first direction (e.g. an applied torque from the primary actuator 306, weight of components of the joint system 300 and exoskeleton, weight from a load carried by the exoskeleton, or others), and can be utilized to release energy and provide a torque to help rotate the support members 305a and 305b connected joint 107c in a second, opposite direction to facilitate application of a secondary torque to the joint system 300. In the example shown, the quasi-passive linear pneumatic actuator 308 can comprise a linear pneumatic spring tunable to a desired stiffness to provide a desired joint stiffness value of the tunable actuator joint assembly 106c. It is noted that in some examples the quasi-passive linear pneumatic actuator 308 can be configured such that an initial amount of energy is stored in the quasi-passive linear pneumatic actuator 308 prior to a rotation in the first direction. In this example, the rotation in the first direction causes energy to be stored in the quasi-passive linear pneumatic actuator 308 in addition to the initial amount of energy already stored in the quasi-passive linear pneumatic actuator 308.

The term "joint stiffness value" refers to the specific joint stiffness of the tunable actuator joint assembly 106c, and is based on the given tuned stiffness of the non-linear pneumatic spring of the quasi-passive linear pneumatic actuator 308 at a given time or under given operating conditions. The joint stiffness value of the tunable actuator joint assembly 106c as provided by the quasi-passive linear pneumatic actuator 308 can be tuned or adjusted by pre-charging an internal chamber of a housing (e.g., see internal housing 330 of FIG. 5A, discussed below) to different amounts to meet different operating needs (e.g., to meet different loads experienced at the joint 107c, such as the loads from the weight of the exoskeleton, or the loads from the exoskeleton in addition to something being carried by the exoskeleton), and/or by energizing the quasi-passive linear pneumatic actuator 308 at different times or rather at different rotational positions of the joint system 300. Indeed, energizing and de-energizing (e.g., opening and closing a valve associated therewith, as explained below) the quasi-passive linear pneumatic actuator 308 at different times during rotation of the support members 305a, 305b about the joint 107c (i.e. at different rotational positions of the joint system 300), operates to simulate different spring characteristics of the quasi-passive linear pneumatic actuator 308, and thus vary the joint stiffness of the tunable actuator joint assembly 106c. The torque available to be applied to the joint system 300 by the quasi-passive linear pneumatic actuator 308 can be based on the tuning of the quasi-passive linear pneumatic actuator 308 and the different joint stiffness values of the associated tunable actuator joint assembly 106c. In other words, the torque applied to the joint system 300 by the quasi-passive linear pneumatic actuator 308 can be variable and based, in part, on the tuned joint stiffness value of the tunable actuator joint assembly 106c, as well as the degree of the displacement of the piston and resulting compression of the fluid within the quasi-passive linear pneumatic actuator.

The tunable actuator joint assembly 106c can comprise a housing 303 in which the components of the joint assembly 106c are disposed, such as the primary actuator 306 and the quasi-passive linear pneumatic actuator 308. In some examples, the housing 303 can comprise one or more stopper protrusions supported on the housing 303, and which serve to mechanically limit the rotation of the second support member 305b relative to the first support member 305a in one or both rotational directions. In the example shown, the one or more stopper protrusions comprises an elongated stopper protrusion 304 that extends along a panel of the housing 303 in different directions, and that is strategically configured and positioned on the housing 303 to prevent rotation of the joint system 300 in both directions beyond a given angular rotation. The functionality of the stopper protrusions is shown in FIGS. 3A and 3C, wherein the second support member 305b is engaged with different portions of the stopper protrusion 304 to stop or limit further rotation of the joint system 300 at different angular positions and in both rotational directions.

The housing 303 can facilitate a coupling or connection between the tunable actuator joint assembly 106c and the first and second support members 305a, 305b. In this example, the housing 303 can be fixedly attached to the first support member 305a and can be rotatably coupled to the second support member 305b. Accordingly, the input member 302b can be fixed to the housing 303, and therefore the first support member 305a, such as via a pinned connection. The output member 302a can be connected to the housing 303 to allow for relative rotation of the output member 302a (e.g. via bearings) and the housing 303 and can be fixedly coupled to the second support member 305b. Of course, the configuration is not intended to be limited, and other configurations and connections are also possible.

The output member 302a can be driven by the primary actuator 306 to cause rotation of the second support member 305b relative to the first support member 305a via the joint 107c. In one example, the primary actuator 306 can comprise a motor. In another example, the primary actuator 306 can comprise a motor and a transmission. In another example, the primary actuator 306 can comprise a motor, a transmission, and one or more linkages to connect to and drive the output member 302a with a mechanical advantage. An example of a primary actuator including a motor and a planetary transmission is more fully explained in U.S. Pat. No. 10,765,537, the contents of which are incorporated by reference in their entirety.

In the example shown, the output member 302a can be in line with the primary actuator 306. That is, the output member 302a and the primary actuator 306 can be oriented and arranged along and can rotate about the same axis of rotation 108c (i.e., their rotational axes are collinear), which axis of rotation 108c is also the axis of rotation of the joint 107c. This allows the packaging of the joint assembly 106c to be compact and reduces the need for torque transfer devices such as belts, pulleys, gears etc., further reducing complexity of the joint assembly 106c. However, this is not intended to be limiting in any way as it is contemplated that, in some examples, the primary actuator 306 can be offset from the axis of rotation 108c of the joint 107c and operable to rotate the joint system 300 via one or more torque transfer devices.

The quasi-passive linear pneumatic actuator 308 can comprise a housing 324 that can contain a pre-charge of pressurized gas (e.g., nitrogen) that can define a maximum available joint stiffness value of the tunable actuator joint assembly 106c at full compression of the gas within the housing 324. In one example, the housing 324 can comprise a cylindrical shape, however this is not intended to be limiting in any way. The housing 324 can further be coupled to the input member 302b at a first end of the housing 324. A movable piston rod 328 can extend from a second end of the housing 328. The piston rod 328 can couple to the output member 302a via a linkage 310, wherein the linkage configuration and the pre-charge gas pressure within the quasi-passive linear pneumatic actuator 308 can be configured to provide a specific torque profile for the joint system 300 that matches what is needed to perform given rotations of the joint system 300.

Figure 6:
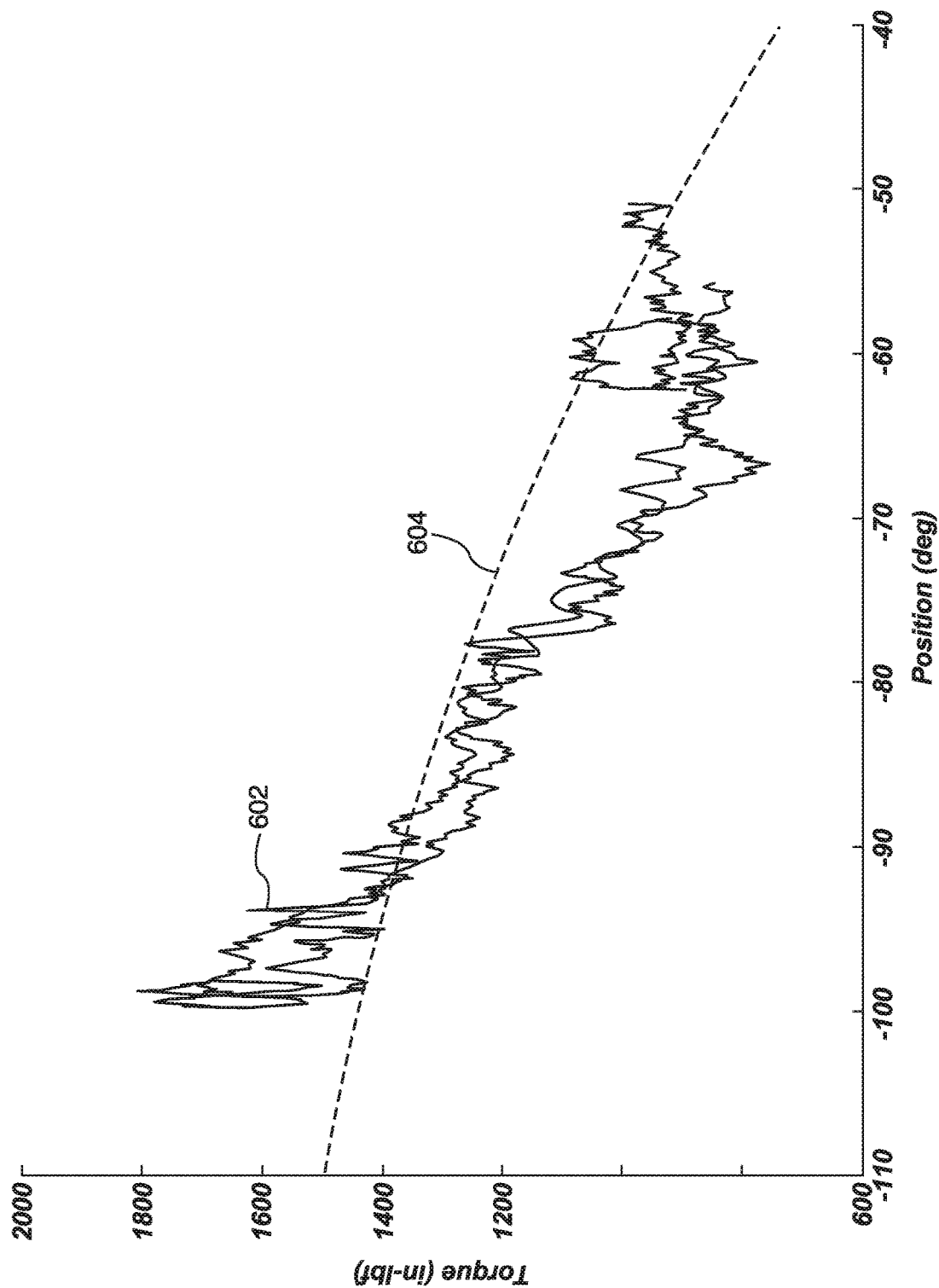
FIG. 6 illustrates an exemplary torque profile of the robotic joint system for performing a squatting motion.

For example, a torque profile of the quasi-passive linear pneumatic actuator 308 can match a torque profile needed to perform a squatting motion and to return upright from the squatting motion. FIG. 6 illustrates an exemplary torque profile at a knee joint for performing a squatting motion. As shown in FIG. 6, a required total torque profile 602 at the knee joint during a squatting motion is higher corresponding to higher degrees of flexion. The total torque profile 602 is lower corresponding to lower degrees of flexion. Accordingly, a torque output profile 604 of a quasi-passive linear pneumatic actuator can be tuned to roughly match the required total torque profile 602 to provide significant energy savings. In the example in FIG. 6, without a quasi-passive linear pneumatic actuator, a primary actuator would be required to provide as much as approximately 1800 in-lb. of torque during a squatting motion. By utilizing a quasi-passive linear pneumatic actuator and linkage tuned to this total torque profile 602, the primary actuator need only provide about 200 in-lb of force (in each direction) to provide the required output. Of course, a linkage and a pre-charge of a quasi-passive linear pneumatic actuator can be configured differently (as well as the timing of the closing of the valve assembly) to accommodate different torque profiles depending on the expected motions of a robotic system.

Returning to FIGS. 3A-4B, the linkage 310 can comprise members 314*a*, 314*b*, 314*c* rotatably coupled together, and that rotatably couple to the quasi-passive linear pneumatic actuator 308, to the housing 303 of the tunable actuator joint assembly 106*c*, and to each other via connectors 312*a*, 312*b*, 312*c*, and 312*d*. The connectors 312*a*, 312*b*, 312*c*, 312*d* can be any suitable connectors, such as pin-type connectors, that facilitate rotation at the connectors between the connected parts. It is noted that while the quasi-passive linear pneumatic actuator 308 is described herein to be oriented such that the piston rod 328 couples to the linkage 310, the quasi-passive linear pneumatic actuator 308 could of course be reversed and oriented such that the housing 324 is connected to the linkage 310 and the piston rod 328 is coupled to the input member 302*b*.

Specifically, a first member 314*a* of the linkage 310 can rotatably connect to the housing 303 via connector 312*a* at an end of the first member 314*a*. The quasi-passive linear pneumatic actuator 308 can rotatably connect to the first member 314*a* via connector 312*b* at an intermediate point (e.g., a midpoint) of the first member 314*a* between ends of the first member 314*a*. The first member 314*a* can rotatably connect to the second member 314*b* via connector 312*c*. The second member 314*b* can rotatably connect to the third member 314*c* via connector 312*d*. The third member 314*c* can couple to the output member 302*a*. In this example arrangement, the piston rod 328 and the linkage 310 can thus define a four-bar mechanism coupling the quasi-passive linear pneumatic actuator 308 between the first and second support members 305*a*, 305*b* via the output and input members 302*a*, 302*b*. This is an indirect coupling of the quasi-passive linear pneumatic actuator 308 to the first and second support members 305*a*, 305*b* as the connection to the first support member 305*a* is through the input member 302*b*, and the connection to the second support member 305*b* is through the output member 302*a* via the linkage 310. In another example, the quasi-passive linear pneumatic actuator 308 can be directly coupled to one or both of the first and second support members 305*a*, 305*b*, to one or more components associated therewith (e.g., the housing 303 in this example). No matter the configuration of the quasi-passive linear pneumatic actuator 308, the first and second support members 305*a*, 305*b* (or any components associated therewith), and/or any linkage operable therewith, the quasi-passive linear pneumatic actuator 308 is intended to be coupled "between" the first and second support member 305*a*, 305*b*, meaning that the quasi-passive linear pneumatic actuator 308 is positioned and suitably coupled within the tunable actuator joint assembly 106*c*, such that rotation of the first and second support members 305*a*, 305*b* connected at the joint 107*c* facilitates or causes actuation of the piston rod 328 within the housing 324, or so that actuation of the quasi-passive linear pneumatic actuator 308 results in a secondary torque applied between the first and second support members 305*a*, 305*b* connected at the joint 107*c* (e.g., a restoring torque, an additive torque, a subtractive torque (i.e., torque applied in an opposing direction as that of a primary torque, a near constant force torque, or a braking torque, depending upon the operational state in which the quasi-passive linear pneumatic actuator is placed). Thus, as the piston rod 328 moves in and out of the housing 324 of the quasi-passive linear pneumatic actuator 308, the linkage 310 moves with rotation of the output member 302*a*. Similarly, as the primary actuator 306 operates to rotate the joint 107*c*, the linkage 310 moves with rotation of the output member 302*a* to move the piston rod 328 in and out of the housing 324 of the quasi-passive linear pneumatic actuator 308. As shown in FIGS. 4A and 4B, the linkage 310, and thus the output member 302*a*, can move from where the piston rod 328 is in an extended position shown in FIG. 4A (which can correspond with an extended position of the tunable actuator joint assembly 106*c* as shown in FIG. 3A) to where the piston rod 328 is in a retracted position shown in FIG. 4B (which can correspond with a flexed position of the tunable actuator joint assembly 106*c* as shown in FIG. 3C). In this manner, and in an active state of the quasi-passive linear pneumatic actuator 308, the quasi-passive linear pneumatic actuator 308 can be configured to store energy upon a first rotation of the support members 305*a*, 305*b* and the joint 107*c* (e.g. when the tunable actuator joint assembly 106*c* moves from an extended position to a flexed position and the linkage 310 and piston rod 328 move from an extended position to a retracted position) and can release energy upon a second rotation of the support members 305*a*, 305*b* (e.g. when the tunable actuator joint assembly 106*c* moves from the flexed position to the extended position and the linkage 310 and piston rod 328 move from the retracted position to the extended position).

The actuator joint assembly 106*c* can further comprise a sensor that is operable to measure or sense a force or a load applied within the joint system 300 by the quasi-passive linear pneumatic actuator 308, which information obtained from interrogation of the sensor can be used in the control algorithm for the primary actuator 306. In this example, the sensor can comprise a load cell 316 operably coupled to the linkage 310. The load cell 316 can be disposed on and supported by one of the members of the linkage 310, in this example, the second member 314*b* of the linkage 310, although the load cell 316 can be located in any number of other positions based on a desired configuration (including on the piston rod 328). The load cell 316 can comprise any suitable load cell such as a strain gauge load cell, a pneumatic load cell, a hydraulic load cell, a piezoelectric load cell, or the like. The load cell 316 can be connected to and operable with a computer or computerized control system operable with the tunable actuator joint assembly 106*c* or to a computerized control system of a robot or robotic device (e.g., see computerized control system 318), which receives and processes the signals and associated data from the load cell 316 for one or more purposes, such as to provide measured information and feedback to the computerized control system 318. The computerized control system 318 can comprise a computer having one or more processors operable with one or more memory devices to provide various processing functions, and to execute one or more executable programs comprising computer readable instructions or code. The computerized control system 318 can be associated with the load cell 316, with various load cell(s) or other sensors within the robotic system 100 (such as load cell(s) or other sensors associated with the primary actuator 306, or that can be used to measure the combined total output of the joint system 300), as well as with other operating components of the robotic system 100. With the load cell 316 on the linkage 310 between the quasi-passive linear pneumatic actuator 308 and the output member 302*a*, the load cell 316 can sense or measure a force or torque applied by the quasi-passive linear pneumatic actuator 308 to the output member 302*a* and the joint 107*c* to facilitate control of the output torque of the joint 107*c* and the joint system 300. The computerized control system 318, using measured information and feedback from the load cell 316, can calculate an amount of force or torque being applied to the output member 302*a* by the quasi-passive linear pneumatic actuator 308. Information from the load cell 316 can be used and processed by the computerized control system 318 in combination with a measured torque output provided by the primary actuator 306 alone (as measured by a load cell or other sensor associated with the primary actuator 306) or a measured total torque output provided by the joint system 300 (as measured by one or more load cells or other sensors associated with the joint system 300) to control output torque of the joint 107*c* (and the joint system 300) by facilitating a calculation of a portion of the torque being applied to the joint system 300 by the quasi-passive linear pneumatic actuator 308. In other words, the robotic system 100, and particularly the joint system 300, can comprise a sensor (e.g., load cell) that measures the total combined output torque of the joint 107*c* (i.e., the resultant output of the primary actuator 306 and the quasi-passive linear pneumatic actuator 308), or a sensor that measures the output torque of the primary actuator 306 alone, or both of these. With one or both of these sensors operating in conjunction with the load cell load cell 316 on the linkage 310 between the quasi-passive linear pneumatic actuator 308 and the output member 302*a*, the computerized control system 318 can, in the case of the measuring of the combined output torque of the joint 107*c*, subtract the output torque of the quasi-passive linear pneumatic actuator 308 as measured by the load cell 316 from the total combined output torque to determine a needed primary actuator torque output to effectuate a rotational position of the joint system 300 (e.g., to maintain the joint system 300 in a stationary rotational position, such as to compensate for gravitational forces acting on the joint system 300, or to effectuate rotation of the joint system 300 using the least amount of power from the primary actuator 306 (e.g., to overcome gravitational forces)); or the computerized control system 318 can, in the case of the measuring of the output torque of the primary actuator 306 alone, add this torque output measurement to the measured torque output of the quasi-passive linear pneumatic actuator 308 to obtain or determine a needed combined torque output to effectuate the rotational position of the joint system 300. Indeed, the computerized control system 318 can then utilize this information in the control algorithms of the primary actuator 306, such as to base, at least in part, an amount of force or torque to be output by the primary actuator 306 to rotate the joint system 300 on the measured information and feedback provided by the load cell 316. Indeed, any information generated based on measurements sensed by the load cell 316 during operation of the tunable actuator joint assembly 106*c* can be incorporated into the control logic used to operate the primary actuator 306. In one example, with the quasi-passive linear pneumatic actuator 308 functioning as a spring, the primary actuator can be caused to apply a lower amount of torque to the joint system 300 due to the secondary torque as contributed to by the quasi-passive linear pneumatic actuator 308, with the reduction in the required primary torque being based on the applied secondary torque by the quasi-passive linear pneumatic actuator 308 as sensed by the load cell 316, and as processed by the computerized control system 318. With the incorporation of such load cell derived information, the primary actuator 306 can be actuated to control operation of the joint 107*c* with increased efficiency and precision.

Although not as accurate as a direct measurement of the force/torque produced by the quasi-passive linear pneumatic actuator 308, in another example, a sensor can be placed within the compression and expansion chambers, and the pressure in the compression and expansion chambers measured, wherein a model of the friction in the quasi-passive actuator can be used to estimate the force/torque produced by the quasi-passive linear pneumatic actuator 308.

In another example, the load cell 316 can be omitted and the joint system 300 can be controlled based on a measured torque of the primary actuator 306 and/or based on a measured total combined output torque, such as via a load cell 317 disposed on the input member 302*b* of the joint assembly 016*c*. In this example, the torque contribution from the quasi-passive pneumatic actuator 308 can be treated as a disturbance (i.e. like an external force/torque applied to the joint system 300 that the control policy must be able to handle) in the control logic in order to control the primary actuator 306. However, in other examples, the contribution of the quasi-passive pneumatic actuator 308 can still be maintained and the joint system 300 can still be controlled without the measurement of the exact contribution of the quasi-passive pneumatic actuator 308.

FIG. 5A shows a perspective view of the quasi-passive linear pneumatic actuator 308 according to one example of the present disclosure and FIG. 5B shows a section view of the quasi-passive linear pneumatic actuator 308. With reference to FIGS. 1A-5B, the housing 324 can comprise an internal chamber 330 that can contain pressurized gas. In one example, the internal chamber 330 can comprise an airtight cylindrical chamber. A piston 326 can be coupled to a section of the piston rod 328, and both can be linearly movable through and within the internal chamber 330 of the housing 324. The piston 326 can divide the internal chamber 330 into a compression chamber 332 and an expansion chamber 334 within the housing 324. In other words, the internal chamber 330 of the housing 324 can comprise a compression chamber 332 and an expansion chamber 334, with the piston 326 separating these.

A neutral position of the piston 326 within the internal chamber 330 (i.e. a position at which pressure in the compression chamber 332 and the expansion chamber 334 are equal) can be different depending upon the desired performance. In one example neutral position, the piston 326 can be positioned, such that the compression and expansion chambers 332 and 334 comprise equal volumes. In another example neutral position, the piston 326 can be positioned, such that the compression and expansion chambers 332 and 334 comprise disparate or different volumes.

The tunable actuator joint assembly 106*c* can comprise a fluid control system for selectively controlling application of the torque of the quasi-passive linear pneumatic actuator 308, including a braking force depending upon the configuration and state of operation of the valve assembly 338 to facilitate proportional control. In one example, such as that shown, the fluid control system can comprise an electrically controlled valve assembly 338 that can be selectively operated to switch the quasi-passive linear pneumatic actuator 308 between an active state and an inactive state as discussed above, such as via the computerized control system 318. In some examples, the valve assembly 338 can comprise a type and configuration that facilitates operating the quasi-passive linear pneumatic actuator 308 in a semi-active state. In this example, the valve assembly 338 can be of a type that permits the valve to be partially opened (or to be modulated or in other words actuated via pulse-width modulation, depending upon the type of valve device being used), such that the quasi-passive linear pneumatic actuator 308 is caused to store at least some spring-like energy and to dissipate at least a portion of the stored energy during continued rotation of the joint system 300, thereby functioning as a damper to apply a braking force to the joint system 300 (or to release any stored energy into the joint system 300 in the form of an applied torque upon rotation of the joint system 300 in an opposite direction). With the valve assembly 338 partially open, some energy will be stored and some energy will be dissipated through the valve assembly 338 during the various rotations of the joint system 300.

In one example, the valve assembly 338 can comprise a type of valve device that can be selectively activated (energized) and deactivated (de-energized) to restrict or allow fluid to pass through the valve assembly 338, where the valve assembly 338 can be configured and operable to default to an open position. In one example, the valve assembly 338 can be biased in the open position, such that it must be energized to close the valve assembly 338. However, other configurations are also possible as explained below. Example valves include, but are not limited to zero leak solenoid valves manufactured by The Lee Company or the NOVA Koaxial-Magnetventil valve manufactured by NOVA SWISS.

In another example, the valve assembly 338 can comprise a valve device that can be selectively activated (facilitates an active state of the quasi-passive linear pneumatic actuator 308), deactivated (facilitates an inactive state of the quasi-passive linear pneumatic actuator 308) or partially activated (facilitates a semi-active state of the quasi-passive linear pneumatic actuator 308), thus being configured to dynamically control and vary the joint stiffness value of the tunable actuator joint assembly 106c as provided by the quasi-passive linear pneumatic actuator 308. In other words, the valve assembly 338 can comprise a type of valve device that provides proportional control to position the valve device in one of an infinite number of positions between fully open and fully closed, wherein the quasi-passive linear pneumatic actuator enters a semi-active state. In one specific example, the valve assembly 338 can comprise a servo operable within the valve assembly to control the valve device and the degree to which the valve assembly 338 is opened or closed.

No matter its type or configuration, the valve assembly 338 can be operable to default to an open position. That is, when the valve assembly 338 fails to receive a valid control signal from the control system 318, when the joint system 300 is unpowered, or when the joint system 300 or control system 318 otherwise malfunctions, the valve assembly 338 can be operable to remain or move to an open position, thus placing the quasi-passive linear pneumatic actuator in the inactive state.

In one example, the valve assembly 338 can be biased to an open position such that when the valve assembly 338 is energized, the valve assembly 338 is caused to move to a closed position to prevent fluid to pass through the valve assembly 338. When the valve assembly 338 is de-energized, the valve assembly 338 is caused to be in an open position to allow fluid to pass through the valve assembly 338. With the valve assembly 338 in the open position, the quasi-passive linear pneumatic actuator 308 is de-energized and placed in an inactive state. The valve assembly 338 can be de-energized in different ways, such as when it is not actively actuated or when there is a loss of power to the valve assembly 338. On the other hand, moving the valve assembly 338 to the closed position to cause the quasi-passive linear pneumatic actuator 308 to transition to the energized, active state is achieved by energizing the valve assembly 338 (i.e., actively actuating the valve assembly 338 and the valve device to be in the closed position by powering the valve assembly 338). The valve assembly 338 can be moved to an open position via a biasing member, such as via a linear spring, a leaf spring, a coil spring, or any other mechanical, hydraulic or other type of spring or spring-like device (not shown).

In another example, the joint system 300 can comprise a backup power circuit 370 that is operable to default the valve assembly 338 into the open position, such as in the event of a loss of primary power to the robotic system. The backup power circuit 370 can comprise a backup power source such as a battery. The backup power circuit 370 can be operable to actuate the valve assembly 338 (e.g., as normally closed) to cause the valve assembly 338 to move to the open position. For example, the backup power circuit 370 can comprise a switch that is operable to close upon primary power loss in the robotic system, and in this case to the joint system 300. When the switch of the backup power circuit 370 closes, the backup power circuit 370 provides power to the valve assembly 338 such that the valve assembly 338 moves to the open position, thus placing the quasi-passive linear pneumatic actuator 308 in the inactive state. In this example, the valve assembly 338 can comprise any number of configurations such as a valve that is biased to the closed position, a bi-stable valve that biases into both the open and the closed position, or a valve that does not bias to either the open or closed position (i.e. valves that must be energized to move to or remain in the open position). The backup power circuit 370 is operable to ensure that no matter the configuration of the valve assembly 338, the valve assembly 338 is still operable to default to the open position. The valve assembly 338 defaulting to an open position can provide safety benefits to a user operating the robotic exoskeleton, as will be discussed in more detail below.

The quasi-passive linear pneumatic actuator 308 can further comprise a conduit or tube 340 coupled between ends of the housing 324 that can extend along the housing 324. The tube 324 can comprise a tubular conduit 342b that is in fluid communication with an expansion side conduit 342a formed through one end of the housing 324 that is in fluid communication with the expansion chamber 334 on one side of the piston 326, and that is in fluid communication with a compression side conduit 342c formed through the other end of the housing 324 that is in fluid communication with the compression chamber 332 on an opposite side of the piston 326. The expansion side conduit 342a, the tubular conduit 342b, and the compression side conduit 342c can form a gas passageway from the compression chamber 332 to the expansion chamber 332 bypassing the piston 326. Thus, when the valve assembly 338 is in an open position, a gas flow path exists through the gas passageway between the compression and expansion chambers 332 and 334, and the quasi-passive linear pneumatic actuator 308 is placed in an inactive state where the quasi-passive linear pneumatic actuator 308 is prevented from storing or releasing spring-like energy (but still capable of providing near constant force type of storage and release of energy). Conversely, when the valve assembly 338 is in a closed position, the gas passageway is closed off and the quasi-passive linear pneumatic actuator 308 is placed in an active state where it can store and release spring-like energy into the joint system 300.

Depending upon the type of valve device, in some examples, the valve assembly 338 can be partially opened, wherein the quasi-passive linear pneumatic actuator 308 is in a semi-active state to store and release some degree of spring-like energy depending upon the degree of openness (or conversely the degree of closure) of the valve assembly 338. In this state, the quasi-passive linear pneumatic actuator 308 can function as a brake and/or damper. The valve assembly 338 can be selectively controlled via the computerized control system 318 to open the valve assembly 338, partially open the valve assembly 338, or close the valve assembly 338. This selective valve function therefore facilitates the selective engaging and disengaging of the quasi-passive linear pneumatic actuator 308 (and in some examples the semi-disengaging of the quasi-passive linear pneumatic actuator 308 if permitted by the valve). It is noted that while the gas passageway comprised of the expansion side conduit 342a, the tubular conduit 342b, and the compression side conduit 342c is shown extending outside of the housing 324, this is not intended to be limiting. The gas passageway can be formed in any suitable configuration, such as being integrated or partially integrated into the housing 324.

In one example, the internal chamber 330 of the housing 324 may not be gas pressure charged, but at an ambient gas pressure, such that a joint stiffness value of the tunable actuator joint assembly 106c, and particularly the quasi-passive linear pneumatic actuator 308, is near ambient gas pressure. In another example, the internal chamber 330 of the housing 324 can be gas pressure charged (e.g., to 500-3000 or more psi) to define and provide a given joint stiffness value of the tunable actuator joint assembly 106c. The magnitude of the gas pressure charge can be varied to vary the joint stiffness value of the tunable actuator joint assembly 106c to meet different operating conditions and to accommodate different loads or forces acting on the joint 107c, namely to gravity compensate the weight of the exoskeleton above the joint 107c, including anything being carried by the exoskeleton. In one specific example, the internal chamber 330 of the housing can be gas pressure charged to a pre-charge of a certain pressure (e.g., 900 psi) to provide a joint stiffness value suitable to facilitate an applied torque to the joint system 300 by the tunable actuator joint assembly 106c to gravity compensate and raise the exoskeleton from a squatting position (the exoskeleton having a known weight and known mass properties at the joint 107c) from a squatting position. This pre-charged gas pressure can be achieved during manufacture, or dynamically in the field by a user, such as via a gas pressure source 345 in fluid communication with an input valve 344a. It is noted that both the pre-charged gas pressure and the configuration of the linkage assembly can be tuned to provide a given torque profile. In one example, the pre-charged gas pressure can be tuned to provide a torque profile that exceeds what is needed for a given rotation of the joint system 300. For example, the above-mentioned pre-charge of 900 psi to provide a joint stiffness value suitable to facilitate an applied torque to the joint system 300 by the tunable actuator joint assembly 106c to gravity compensate and raise the exoskeleton from a squatting position may be inadequate to raise the exoskeleton from the squatting position when carrying a load. As such, the pre-charged gas pressure can be tuned to match the torque profile needed to restore the exoskeleton and the carried load from a squatting position. Specifically, the internal chamber 330 of the housing can be gas pressure charged to a pre-charge of an amount above 900 psi (e.g., 1,500 psi) to provide a joint stiffness value suitable to facilitate an applied torque to the joint system 300 by the tunable actuator joint assembly 106c sufficient to gravity compensate and raise the exoskeleton and the carried load from a squatting position. It is also noted that a joint stiffness value of the tunable actuator joint assembly 106c can be varied by recruiting any amount of the pre-charged gas pressure. This can be accomplished by closing the valve assembly 338 at different rotational positions of the joint system (and different positions of the piston 326 within the housing 324) during a first rotation, for example, when there is less compression of the gas within the internal chamber 330 and different pressures acting on both sides of the piston 326. It is noted that the specific examples provided herein are not intended to be limiting in any way, and that different robotic systems can comprise different configurations, and thus different pre-charge pressures.

The pre-charged gas pressure and/or stored energy from rotation of the joint system 300 can be dynamically modified (increased or decreased) by adding or relieving gas pressure in the internal chamber 330 of the housing 324 via the input valve 344a and a release valve 344b, for instance, each of which are in fluid communication with the internal chamber 330. This is one example of what is meant by "tunable" actuator joint assembly. Indeed, in one aspect, the example tunable actuator joint assembly 106c can be tuned to have a particular joint stiffness value by selecting the magnitude of gas pressure charged in (or removed from) the internal chamber 330 of the housing 324. In another aspect, the joint stiffness value of the tunable actuator joint assembly 106c can be adjusted or tuned by energizing the quasi-passive linear pneumatic actuator 308 at different rotational positions of the joint system 300, thus effectively varying the joint stiffness value as a function of the rotational position of the joint system 300.

The fluid control system, including the valve assembly 338, can further comprise or be in communication with a computer system (e.g., see computerized control system 318) having a controller electrically or communicatively coupled to the valve assembly 338 to facilitate, via computer controlled programming, actuation of the valve assembly 338, thereby selectively switching the valve assembly 338 between an open and a closed position (and in some cases a partially open position, depending upon the configuration of the valve assembly 338 to permit this). The computerized control system 318 can be coupled to a power source (e.g., see power source 319), such as to a battery onboard the robotic device (e.g., in a backpack) or to another power source associated with the robotic system 100 (e.g., a power source connected to the robotic system 100 via a tethered power system).

A coupling device 352 can be disposed at a distal end 350 of the piston rod 328 and can comprise an aperture through which the connector 312b can extend to rotatably couple the quasi-passive linear pneumatic actuator 308 to the linkage 310. Similarly, a coupling device 356 can be disposed at an end 354 of the housing 324 opposite the piston rod 328. The coupling device 356 can comprise an aperture through which the input member 302b extends coupling the quasi-passive linear pneumatic actuator 308 to the housing 303 of the joint assembly 106c (and indirectly to the first support member 305a). In this manner, the linear pneumatic actuator 308 is coupled between the first support member 305a and the second support member 305b of the joint system 300 via the input member 302b, the linkage 310, and the output member 302a. Thus, the quasi-passive linear pneumatic actuator 308 308 can help to facilitate relative rotation between the first and second support members 305a, 305b by applying a torque within the joint system 300 (i.e. by applying a torque between the input member 302b and output member 302a to facilitate relative rotation between the first and second support members 305a, 305b), or it can facilitate application of a braking force within the joint system 300.

In operation, upon a first rotation of the first support member 305a relative to the second support member 305b, such as a powered rotation of the joint system 300 via the primary actuator 306, or a less powered or no powered rotation of the joint system 300 due to gravitational or other forces acting on the joint system 300 (e.g., moving into a squatting position that causes a gravity induced lowering of the exoskeleton and a simultaneous rotation of the joint system 300 with the primary actuator 306 applying a smaller torque in light of the gravitational forces to facilitate controlled descent of the exoskeleton), in which the joint system 300 transitions from an extended position shown in FIG. 3A into a flexed position shown in FIG. 3C), and with the valve assembly 338 in the closed position (thus placing the quasi-passive linear pneumatic actuator 308 in the active state), the piston rod 328 and the piston 326 of the quasi-passive linear pneumatic actuator 308 move from an extended position (such as shown in FIG. 4A) towards a retracted position (such as shown in FIG. 4B) relative to the housing 324. This first rotation can function to store gas pressure energy within the compression chamber 332 due to the valve assembly 338 being in the closed position, and due to the piston 326 operating to compress the gas therein. Upon a second rotation of the first support member 305a relative to the second support member 305b (e.g., such as actuating the primary actuator to cause the exoskeleton to stand from a squatting position), this stored energy can be released when gas pressure exerted against the piston 326 is allowed to expand as the piston 326 is caused to move in the opposite direction. This can cause application of an axial force to the piston rod 328 which operates to apply a torque to the output member 302a via the linkage 310 to rotate the output member 302a, and thus the joint system 300. The torque applied to the output member 302a by the quasi-passive linear pneumatic actuator 308 can be applied in parallel with the primary torque being applied by the primary actuator 306, the combined torques in this manner representing one example of an aggregate torque applied to the joint system 300. In an example where the torque applied to the output member 302a by the quasi-passive linear pneumatic actuator 308 (i.e. secondary torque) exceeds that which is required to rotate the joint system 300 from the squatting position to the standing position, the primary torque of the primary actuator can operate against the secondary torque to achieve the desired aggregate torque to move from the squatting position to the standing position in a controlled manner.

Energy storage within, and the torque provided by, the quasi-passive linear pneumatic actuator 308 can be controlled based on the charge pressure in the internal compartment and based on a rotational position of the joint system 300 and a linear position of the piston 326 when the valve assembly 338 is actuated to go from the open position to the closed position. In one example, as discussed, the quasi-passive linear pneumatic actuator 308 can be operated, such that upon a first rotation of the joint system 300 (e.g. a motion from an extended into a flexed position) the quasi-passive linear pneumatic actuator 308 can store potential energy (e.g., such as during a lowering of the exoskeleton under the influence of gravity and a lower or no torque as applied by the primary actuator 306 during a squatting motion) in accordance with a degree of rotation and compression of the gas within the quasi-passive actuator via displacement of the piston. The rotational position of joint system 300 and the timing of the energizing of the valve assembly 338 can vary to provide different spring characteristics and functions within the joint system 300. Upon a second rotation (e.g. a motion from a flexed into an extended position), the quasi-passive linear pneumatic actuator 308 can release energy and provide a secondary torque that combines with a primary torque from the primary actuator 306 to provide an aggregate torque operable to assist in rotation of the joint system 300. In another example, the linear pneumatic actuator 308 can be tuned such that upon a first rotation of the joint system 300 (e.g. a motion from an extended into a flexed position) the quasi-passive linear pneumatic actuator 308 can store energy from the actuation of the primary actuator 306 (optionally in addition to any energy from gravity, such in the case of the knee joint 107c). In this example, the quasi-passive linear pneumatic actuator 308 can provide all or a large portion of the force or torque required to cause a second rotation of the joint system 300 (e.g. a motion from a flexed to an extended position). As such, the primary actuator 306 can be caused to be operated with less power to effectuate the second rotation of the joint 107c due to the torque from the primary actuator combining with the torque from the quasi-passive linear pneumatic actuator 308. In another example, with the second rotation of the joint system 300 acting against gravity, for example causing the exoskeleton to go from a squatting position to a standing position, a smaller motor can be incorporated into the tunable actuator joint assembly 106c than would otherwise be needed without the existence of the quasi-passive linear pneumatic actuator 308 within the tunable actuator joint assembly 106c. A smaller motor can typically be incorporated into the tunable actuator joint assembly 106c in the event that the first and second support members 305a, 305b connected at the tunable actuator joint assembly 106 primarily undergo first and second rotations that are with and against gravitational forces, respectively, where gravitational forces combine with the torque from the primary actuator 306 to rotate the first and second support members 305a, 305b connected at the joint 107c to a flexed position during the first rotation, thus effectively storing energy within the quasi-passive linear pneumatic actuator 308, and where the quasi-passive linear pneumatic actuator 308 applies a torque that combines with a suitable torque from the primary actuator 306 to overcome gravitational forces and to rotate the first and second support members 305a, 305b connected at the joint 107c to an extended position during the second rotation of the first and second support members 305a, 305b connected at the joint 107c.

In some examples, energy recovery can also be possible via the primary actuator 306 when the quasi-passive actuator returns energy where the energy returned exceeds the required work to operate the system. For example, when the quasi-passive linear pneumatic actuator 308 is tuned such that upon a first rotation of the first and second support members 305a, 305b connected at the joint 107c (e.g. a motion from an extended into a flexed position) the quasi-passive linear pneumatic actuator 308 stores energy from the actuation of the primary actuator 306 (optionally in addition to any energy from gravity, such in the case of the knee joint 107c), the quasi-passive linear pneumatic actuator 308 can return more energy in the form of a secondary torque than is required to perform a second rotation of the first and second support members 305a, 305b connected at the joint 107c (e.g. a motion from the flexed position to the extended position). To achieve the desired motion, the primary actuator 306 can be operable to produce or provide a primary torque that functions to work against the quasi-passive linear pneumatic actuator 308 during the second rotation of the first and second support members 305a, 305b connected at the joint 107c (e.g. a motion from the flexed position to the extended position). In this example, primary torque from the primary actuator 306 can be combined with the secondary torque from the quasi-passive linear pneumatic actuator 308 to provide an aggregate torque at the joint 107c even though the primary torque is working against the secondary torque in this example. In one example, the primary actuator 306 can be operated in a regenerative manner so as to return energy to a power supply of the robotic system 100 and/or provide energy to operate other parts of the robotic system 100.

As mentioned above, the valve assembly 338 can be operable to default to an open position. In this manner, when the valve assembly 338 is not actuated, namely when the valve assembly 338 has no power or experiences a loss of power, the valve assembly 338 moves to or remains in the open position allowing the pressure of gas within the internal chamber 330 to equalize on both sides of the piston 326 in the compression chamber 332 and the expansion chamber 334. With the valve assembly 338 in the open position, the quasi-passive linear pneumatic actuator 308 is in the inactive state where the quasi-passive linear pneumatic actuator 308 does not store or release energy in a spring-like manner, but rather functions as a near-constant force actuator capable of releasing lesser magnitudes of energy to still do some work, upon a relative rotation the first and second support members 305a, 305b. With the valve assembly 338 defaulting to an open position, the inactive state of the quasi-passive linear pneumatic actuator 308 is a default state of the quasi-passive linear pneumatic actuator 308. This can provide several safety benefits to a user. For example, some prior quasi-passive actuators can have a relatively large amount of energy stored therein based on a position of a piston within an internal chamber when primary power loss or another malfunction occurs in an associated joint assembly. This primary power loss or other malfunction can cause a loss of control or power to a primary actuator. When such control of the primary actuator is lost, and with a large amount of energy stored in the prior quasi-passive actuator, the prior quasi-passive actuator can cause uncontrolled, sudden, and strong relative rotation of first and second support members associated with a joint. Such uncontrolled relative rotation of the first and second support members can result in damage to the first and/or second support members, the joint assembly, or to other components of a robot or robotic system. In the case of a robotic exoskeleton worn by a user, the uncontrolled relative rotation of the first and second support member can result in harm or injury to the user.

Unlike prior quasi-passive actuators, with the quasi-passive linear pneumatic actuator 308 disclosed herein, the quasi-passive linear pneumatic actuator 308 defaults to an inactive state upon loss of power to or other malfunction of the joint assembly 106c as the valve assembly 338 is caused to move to or to be maintained in the open position, wherein the fluid or gas pressure is caused to equalize between the compression chamber 332 and the expansion chamber 334. This allows any energy stored in the quasi-passive linear pneumatic actuator 308 to be dissipated via the valve assembly 338 without sudden movements to the piston 326 and piston rod 328 of the quasi-passive linear pneumatic actuator 308, while providing a significantly reduced force that assists the joint to get in a safe position (e.g. in an extended pose for the knee joint). Thus, the quasi-passive linear pneumatic actuator 308 experiences no sudden, uncontrolled movement, which therefore prevents sudden, uncontrolled relative rotation of the joint system 300 including the first and second support member 305a, 305b. Thus, the joint assembly 106c, the first and second support members 305a, 305b, and any robotic system in which they are utilized is protected from damage from such movements. Further, the safety of a user operating a robotic exoskeleton incorporating the quasi-passive linear pneumatic actuator 308 is preserved and enhanced over prior exoskeleton type robotic system as movements within the exoskeleton type robotic system taught herein will always be anticipated and expected.

As mentioned herein, the quasi-passive linear pneumatic actuator 308 can also be configured to behave as a constant force actuator, wherein the quasi-passive linear pneumatic actuator 308 biases the piston rod 328 to an extended position to help position the tunable actuator joint assembly 106c and the joint system 300 to an extended position in the event of a loss of power to or other malfunction of the robotic system 100. As shown, the piston rod 328 is connected to the piston 326 such that the piston rod 328 extends from one side of the piston. This results in a surface area of a compression side 358 of the piston 326 being larger than a surface area of an expansion side 360 of the piston 326 (by an amount of the cross-sectional area of the piston rod 328). Because the amount of force exerted on a surface is equal to the chamber pressure multiplied by the area difference on both sides of the piston minus the force applied by ambient pressure to the piston rod ($F = P_{chamber} \times A_{difference} - P_{external} \times A_{rod}$), when the pressure is equalized in the compression chamber 332 and the expansion chamber 334 with the valve assembly 338 in the default open position, the larger area of the compression side 358 of the piston 326 as compared to the area of the expansion side 360 of the piston 326 results in a larger force exerted on the compression side 358 of the piston 326 than is exerted on the expansion side 360 of the piston 326. Thus, when the quasi-passive linear pneumatic actuator 308 is in the inactive state with the valve assembly 338 in the open position, and the piston chamber pressure exceeds the ambient pressure, the quasi-passive linear pneumatic actuator 308 functions as a near constant force actuator, wherein a net force acting on the piston 326 biases the piston 326 and piston rod 328 outwards and towards the extended position (the position shown in FIG. 4A) by the greater force acting on the compression side 358 of the piston 326 as compared to the force acting on the expansion side 360 of the piston 326. This residual biasing force effectively creates a torque that is applied to the joint system 300 by the quasi-passive linear pneumatic actuator 308, which applied torque biases the joint system 300 to move to an extended rotational position in a controlled manner. Accordingly, in this example, an extended position of the cylinder 326 and the piston rod 328, and thus an extended position of the joint system 300 (i.e. the position shown in FIGS. 3A and 4A), can be termed a default position of the joint system 300.

In this inactive state of the quasi-passive linear pneumatic actuator 308 with the valve assembly 338 open, the torque applied to rotate the joint system 300 will typically be less than the torque applied to the joint system 300 with the valve assembly 338 closed and the quasi-passive linear pneumatic actuator 308 in the active state and functioning as an air spring. As such, the torque applied to the rotate the support members 305a and 305b about the joint 107c can be used to assist the user in rotating the support members 305a and 305b about the joint 107c to the default extended position. More specifically, the quasi-passive linear pneumatic actuator 308 can be configured to help (i.e., assist the user) facilitate the return of the joint system 300, including the quasi-passive linear pneumatic actuator 308 actuator, the tunable actuator joint assembly 106c, the first and second support members 305a and 305b, and the joint 107c, to the default position. This can further enhance safety, such as by helping a user overcome the weight of a robotic skeleton when power is lost or another malfunction occurs (e.g., applying a torque that combines with the torque energy to the joint system 300 as input by the user to move the exoskeleton from a squatting position to a standing position in the event of a power failure to or malfunction of the primary actuator 306).

Figure 7:
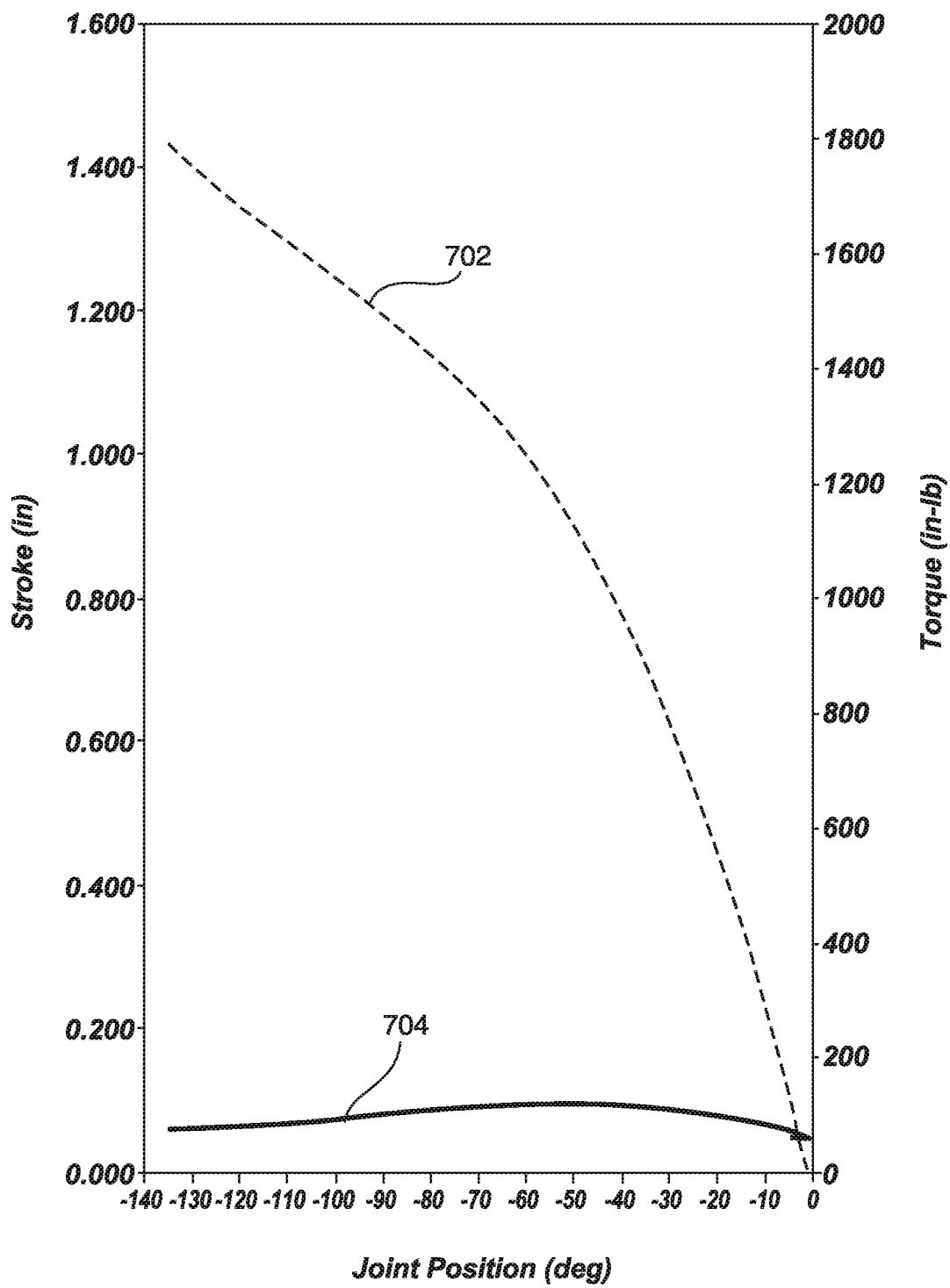
FIG. 7 illustrates exemplary torque profiles of the quasi-passive linear pneumatic actuator of the robotic joint system in an active and an inactive state.

An example of the differences in torque applied the quasi-passive linear pneumatic actuator 308 between the active and inactive states is shown in FIG. 7. FIG. 7 is a plot of exemplary torque profiles of the quasi-passive linear pneumatic actuator 308 of the robotic joint system in an active and an inactive state. As shown in FIG. 7, an active torque profile 702 of the quasi-passive linear pneumatic actuator 308 in the active state shows that the torque provided by the quasi-passive linear pneumatic actuator 308 increases as the joint position goes to a greater degree of flexion. When the quasi-passive linear pneumatic actuator 308 is in the inactive state, an inactive torque profile of the quasi-passive linear pneumatic actuator 308 shows a relatively constant and small torque applied by the quasi-passive linear pneumatic actuator 308 over different degrees of flexion.

Thus, the valve assembly 338 defaulting to the open, inactive state can be considered an integrated safety feature of the tunable actuator joint assembly 106c and the joint system 300 (or any other suitably equipped and configured actuator joint assembly of the robotic system). Further, the integrated safety of the tunable actuator joint assembly 106c and the joint system 300 can be achieved without decoupling the operation of the quasi-passive linear pneumatic actuator 308 from that of the rotation of the joint system 300, namely, such as via a clutch or other similar decoupling mechanism, as is done in prior devices or systems. In other words, rather than using a clutch or other mechanism to selectively decouple the operation of a quasi-passive actuator from the operation of the tunable actuator joint assembly and the rotation of the joint system at select times, the quasi-passive linear pneumatic actuator 308 is always maintained in continuous operation with operation of the actuatable joint assembly 106c (namely the primary actuator 306) and rotation of the joint system 300, meaning that the piston rod 328 and piston 326 continuously move with the output member 302a and rotation of the joint system 300. This is achieved by having the quasi-passive linear pneumatic actuator 308 continuously and always coupled and in operation with the primary actuator 306 between the input and output members (directly or indirectly) without any clutch or other decoupling mechanism potentially decoupling the quasi-passive linear pneumatic actuator 308 and its operation from joint system rotation. Unlike the prior art, the tunable actuator joint assembly 106c with its quasi-passive linear pneumatic actuator 308 is able to enter an inactive state where energy is neither stored nor released in a spring-like manner, but dissipated due to the configuration of the valve assembly 338 associated with the quasi-passive linear pneumatic actuator 308, and the free flow of fluid through the valve assembly 338, as discussed herein, resulting in a near constant restoring force, which is an improvement over clutch or other mechanisms that serve to decouple, at select times, the quasi-passive actuators in the prior art from the operation of their associated joint.

In one specific example that will produce a specific torque profile, the quasi-passive linear pneumatic actuator 308 can have a travel of about 1.3 inches and the compression chamber 332 can have a change in volume from 3.5 cubic inches to 1.44 cubic inches. This increases the pressure in the compression chamber 332 by a factor of 2.43. In this example, with an initial charge pressure of 900 psi, the pressure in the compression chamber 332 when fully compressed would be 2,187 psi. This example is not intended to be limiting in any way, as will be apparent to those skilled in the art, and it will be appreciated that these values can be different for differently configured quasi-passive linear pneumatic actuators.

Note that the quasi-passive linear pneumatic actuator 308 discussed herein can be charged with a two-phase fluid. For instance, the linear pneumatic actuator 308 can be pressure charged with a fluorocarbon or fluorocarbon refrigerant (e.g., Freon), which can initially be in a gaseous state when the quasi-passive linear pneumatic actuator 308 is precharged or in a nominal position, wherein upon pressure or compression of the gas inside the compression chamber (due to rotation of the joint system), the gaseous fluid can transition to a liquid state. This provides the tunable actuator joint assembly with the advantageous properties of a liquid under compression, as compared to a gaseous fluid, which can enhance the stability of the system.

As indicated above, in examples where a particular tunable actuator joint assembly discussed herein is incorporated to provide a joint in an upper body exoskeleton, the quasi-passive linear pneumatic actuators can provide a gravity compensation function, such as when the arms are raised to support a load, such as cargo, armor, and/or weapon masses, or any other load carried by the robotic system 100. That is, when the arm is raised while supporting a load, the quasi-passive linear pneumatic actuator can be operable to apply a torque to resist the forces of gravity acting on the load and to assist in lifting the load.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined or interchanged with other embodiments or features described herein, this disclosure should be read to describe any such combinations that would be practicable by one of ordinary skill in the art no matter the specific embodiments that were described. Indeed, unless a certain combination of elements or functions not expressly disclosed would conflict with one another, such that the combination would render the resulting embodiment inoperable or impracticable as would be apparent to those skilled in the art, this disclosure is meant to contemplate that any disclosed element or feature or function in any embodiment or example described herein can be incorporated into any other embodiment or example described herein (e.g., the elements or features or functions combined or interchanged with other elements or features or functions across embodiments or examples) even though such combinations or interchange of elements or features or functions and resulting embodiments or examples may not have been specifically or expressly disclosed and described. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A robotic joint system with integrated safety comprising:
    a first support member and a second support member;
    a tunable actuator joint assembly rotatably coupling the first support member to the second support member, the tunable actuator joint assembly comprising a joint having an axis of rotation about which the first support member and the second support member rotate, the tunable actuator joint assembly comprising:
        a primary actuator operable to apply a primary torque to facilitate actuation of the first and second support members about the joint; and
        a quasi-passive linear pneumatic actuator coupled between the first and second support members and operable to apply a secondary torque to facilitate actuation of the first and second support members about the joint, the quasi-passive linear pneumatic actuator comprising:
            a housing that is gas pressure charged with a gas at a selected gas pressure;
            a piston supported within the housing and a piston rod extending from the piston, wherein the piston and the piston rod are movable in a linear motion within the housing, and wherein the piston divides a compression chamber and an expansion chamber within the housing;
            a gas passageway that fluidly connects the compression chamber and the expansion chamber; and
            a valve in fluid communication with the gas passageway that selectively restricts flow through the gas passageway, wherein the valve is operable to default to an open position,
        wherein the quasi-passive linear pneumatic actuator comprises an active state with the valve closed, such that the piston compresses the gas in the compression chamber to cause the quasi-passive linear pneumatic actuator to store energy upon a first rotation of the first and second support members about the joint and to release energy upon a second rotation of the first and second support members about the joint in a direction opposite a direction of the first rotation to apply the secondary torque to facilitate the first and second rotations of the first and second support members about the joint, and
        wherein the quasi-passive linear pneumatic actuator comprises an inactive state with the valve open, such that gas flows through the gas passageway between the compression chamber and the expansion chamber, and a net force acting on the piston biases the piston and piston rod to an extended position, such that the secondary torque is applied to facilitate return of the first and second support members to a default position about the joint.

2. The system of claim 1, wherein the piston rod is coupled to one of the first support member or the second support member, such that actuation of the quasi-passive linear pneumatic actuator in the active state applies the secondary torque to one of the first support member or the second support member.

3. The system of claim 2, wherein the secondary torque applied by the quasi-passive linear pneumatic actuator is operable to compensate against a gravitational force acting on the joint system.

4. The system of claim 2, wherein the piston rod is coupled to one of the first support member or the second support member via a linkage.

5. The system of claim 4, wherein the tunable actuator joint assembly further comprises a load cell supported on the linkage, the load cell being configured to sense and measure a force applied by the quasi-passive linear pneumatic actuator.

6. The system of claim 5, wherein the primary torque applied by the primary actuator is based at least in part from feedback received from the load cell.

7. The system of claim 4, wherein the piston rod and the linkage define a four-bar mechanism coupling the quasi-passive linear pneumatic actuator between the first support member and the second support member.

8. The system of claim 4, wherein the linkage is coupled to an output member of the primary actuator.

9. The system of claim 8, wherein the output member is oriented along the axis of rotation of the joint.

10. The system of claim 1, wherein an end of the housing opposite the piston rod is pivotally coupled to one of the first support member or the second support member via a linkage.

11. The system of claim 1, wherein the tunable actuator joint assembly further comprises a force sensor associated with the quasi-passive linear pneumatic actuator operable to sense a force or a load applied by the quasi-passive linear pneumatic actuator.

12. The system of claim 1, wherein the secondary torque applied by the quasi-passive linear pneumatic actuator in the active and inactive states combines with the primary torque applied to the joint by the primary actuator to produce an aggregate torque.

13. The system of claim 12, wherein the aggregate torque comprises the secondary torque applied to the joint by the quasi-passive linear pneumatic actuator in either of the active and inactive states in the same rotational direction as the primary torque applied by the primary actuator.

14. The system of claim 12, wherein the aggregate torque comprises the primary torque applied by the primary actuator in a direction so as to oppose the secondary torque applied by the quasi-passive linear pneumatic actuator in either of the active and inactive states.

15. The system of claim 1, wherein the primary torque from the primary actuator at least partially causes the first rotation, and wherein energy is stored in the quasi-passive linear pneumatic actuator upon the first rotation of the joint.

16. The system of claim 1, wherein the quasi-passive linear pneumatic actuator operates in the inactive state with the valve in the open position upon a failure of the primary actuator.

17. The system of claim 1, wherein the quasi-passive linear pneumatic actuator operates in the inactive state with the valve in the open position upon primary power loss to the robotic joint system.

18. The system of claim 1, wherein the gas passageway extends outside of the housing.

19. The system of claim 1, wherein the valve is biased to the open position.

20. The system of claim 1, further comprising a backup power circuit operable to move the valve to the open position or to retain the valve in the open position.

21. A method for configuring a robotic joint system with integrated safety, the method comprising:
- rotatably coupling a first support member to a second support member via a tunable actuator joint assembly comprising a joint having an axis of rotation about which the first support member and the second support member rotate;
- configuring the tunable actuator joint assembly to comprise a primary actuator operable to apply a primary torque to cause rotation of the first and second support members about the joint;
- configuring the tunable actuator joint assembly with a quasi-passive linear pneumatic actuator;
- configuring the tunable actuator joint assembly with a valve operable to control operation of the quasi-passive linear pneumatic actuator, the valve being operable to default to an open position;
- configuring the quasi-passive linear pneumatic actuator to comprise an inactive state with the valve open, wherein in the inactive state, the quasi-passive linear pneumatic actuator facilitates return of the first and second support members to a default position about the joint; and
- configuring the quasi-passive linear pneumatic actuator to comprise an active state with the valve closed, wherein in the active state, the quasi-passive linear pneumatic actuator facilitates storage of energy upon a first rotation of the first and second support members about the joint and release of energy upon a second rotation of the first and second support members about the joint in a direction opposite a direction of the first rotation to apply a secondary torque to the joint,
- wherein the quasi-passive linear pneumatic actuator operates in the inactive state with the valve in the open position upon a failure of the primary actuator.

22. The method of claim 21, further comprising coupling a piston rod of the quasi-passive linear pneumatic actuator to one of the first support member or the second support member such that actuation of the piston rod applies the secondary torque to one of the first support member or the second support member.

23. The method of claim 22, wherein the piston rod is coupled to one of the first support member or the second support member via a linkage, and wherein the housing is coupled to the other of the first support member or the second support member.

24. The method of claim 23, wherein the piston rod and the linkage define a four-bar mechanism coupling the quasi-passive linear pneumatic actuator between the first support member and the second support member.

25. The method of claim 23, further comprising coupling the linkage to the output member of the primary actuator.

26. The method of claim 25, further comprising configuring the output member along the axis of rotation of the joint.

27. The method of claim 21, further comprising configuring the tunable actuator joint assembly with a force sensor operable to sense an applied force or load of the quasi-passive linear pneumatic actuator.

28. The method of claim 27, wherein the force sensor comprises a load cell.

29. The method of claim 21, wherein the secondary torque from the quasi-passive linear pneumatic actuator combines with the primary torque from the primary actuator to provide an aggregate torque operable to rotate the first and second support members about the joint.

30. The method of claim 21, wherein the primary torque from the primary actuator at least partially causes the first rotation, and wherein energy is stored in the quasi-passive linear pneumatic actuator upon the first rotation of the joint.

31. The method of claim 21, wherein the quasi-passive linear pneumatic actuator operates in the inactive state with the valve in the open position upon primary power loss to the quasi-passive linear pneumatic actuator.

32. The method of claim 21, wherein the quasi-passive linear pneumatic actuator is operable in parallel with the primary actuator.

33. A tunable actuator joint assembly operable to rotatably couple to a first support member and to a second support member and comprising a joint having an axis of rotation about which the first support member and the second support member rotate, the tunable actuator joint assembly comprising:
- a quasi-passive linear pneumatic actuator operable to couple between the first and second support members, the quasi-passive linear pneumatic actuator comprising:
  - a housing that is gas pressure charged with a gas at a selected gas pressure;
  - a piston and a piston rod extending from the piston, wherein the piston and the piston rod are movable in a linear motion within the housing, and wherein the piston divides a compression chamber and an expansion chamber within the housing;
  - a gas passageway that fluidly connects the compression chamber and the expansion chamber; and
  - a valve device in fluid communication with the gas passageway that selectively restricts flow through the gas passageway, the valve device being operable to default to an open position,
- wherein the quasi-passive linear pneumatic actuator comprises an active state with the valve closed, such that the piston compresses the gas in the compression chamber to cause the quasi-passive linear pneumatic actuator to store energy upon a first rotation of the first and second support members about the joint and to release energy upon a second rotation of the first and second support members about the joint in a direction opposite a direction of the first rotation to apply a torque to facilitate the first and second rotations of the first and second support members about the joint, and
- wherein the quasi-passive linear pneumatic actuator comprises an inactive state with the valve open, such that gas flows through the gas passageway between the compression chamber and the expansion chamber, and a net force acting on the piston biases the piston and piston rod to an extended position to facilitate return of the first and second support members to a default position about the joint.

34. The tunable actuator joint assembly of claim 33, further comprising a primary actuator operable to apply a primary torque to facilitate the first and second rotations of the first and second support members about the joint.

35. The tunable actuator joint assembly of claim 33, wherein the valve device comprises an on-off valve.

36. The tunable actuator joint assembly of claim 33, wherein the valve device comprises at least one of a proportional valve or a servo valve.

37. A robotic joint system with integrated safety comprising:
 a first support member and a second support member;
 a tunable actuator joint assembly rotatably coupling the first support member to the second support member, the tunable actuator joint assembly comprising a joint having an axis of rotation about which the first support member and the second support member rotate, the tunable actuator joint assembly further comprising:
  a quasi-passive linear pneumatic actuator coupled between the first and second support members, the quasi-passive linear pneumatic actuator comprising:
   a housing that is gas pressure-charged with a gas at a selected gas pressure;
   a piston and a piston rod extending from the piston, wherein the piston and the piston rod are movable in a linear motion within the housing, and wherein the piston divides a compression chamber and an expansion chamber within the housing;
   a valve assembly operable to control operating states of the quasi-passive linear pneumatic actuator, the valve assembly comprising:
    a gas passageway that fluidly connects the compression chamber and the expansion chamber; and
    a valve device in fluid communication with the gas passageway that selectively restricts flow through the gas passageway, wherein the valve device is operable to default to an open position,
 wherein the quasi-passive linear pneumatic actuator comprises an active state with the valve closed, such that the piston compresses the gas in the compression chamber to cause the quasi-passive linear pneumatic actuator to store energy upon a first rotation of the first and second support members about the joint and to release energy upon a second rotation of the first and second support members about the joint in a direction opposite a direction of the first rotation to apply a torque to facilitate the first and second rotations of the first and second support members about the joint, and
 wherein the quasi-passive linear pneumatic actuator comprises an inactive state with the valve open, such that gas flows through the gas passageway between the compression chamber and the expansion chamber, and a net force acting on the piston biases the piston and piston rod to an extended position to facilitate return of the first and second support members to a default position about the joint.

38. The robotic joint system of claim 37, wherein the tunable actuator joint assembly further comprises a primary actuator operable to apply a primary torque to facilitate the first and second rotations of the first and second support members about the joint.

39. The robotic joint system of claim 37, wherein the valve device of the valve assembly comprises a two-stage valve.

40. The robotic joint system of claim 37, wherein the valve device can be modulated to operate the quasi-passive linear pneumatic actuator in a semi-active state.

41. The robotic joint system of claim 37, wherein the valve device of the valve assembly comprises at least one of a proportional valve or a servo valve operable to place the valve device in a partially open position, wherein the quasi-passive linear pneumatic actuator comprises a semi-active state with the valve device partially open so as to function as at least one of a brake or a damper.

42. The robotic system of claim 41, wherein, with the quasi-passive linear pneumatic actuator in the semi-active state, the piston partially compresses the gas in the compression chamber to cause the quasi-passive linear pneumatic actuator to store at least some amount of energy upon the first rotation.

43. The robotic system of claim 42, wherein the quasi-passive linear pneumatic actuator, in the semi-active state, operates to release the at least some amount of stored energy upon the second rotation.

44. The robotic system of claim 37, wherein the tunable actuator joint assembly comprises a non-powered tunable actuator joint assembly, and wherein the first rotation is caused at least partially by a movement of a user.

45. A method for configuring a robotic joint system with integrated safety, the method comprising:
 rotatably coupling a first support member to a second support member via a tunable actuator joint assembly comprising a joint having an axis of rotation about which the first support member and the second support member rotate;
 configuring the tunable actuator joint assembly to comprise a primary actuator operable to apply a primary torque to cause rotation of the first and second support members about the joint;
 configuring the tunable actuator joint assembly with a quasi-passive linear pneumatic actuator;
 configuring the tunable actuator joint assembly with a valve operable to control operation of the quasi-passive linear pneumatic actuator, the valve being operable to default to an open position;
 configuring the quasi-passive linear pneumatic actuator to comprise an inactive state with the valve open, wherein in the inactive state, the quasi-passive linear pneumatic actuator facilitates return of the first and second support members to a default position about the joint; and
 configuring the quasi-passive linear pneumatic actuator to comprise an active state with the valve closed, wherein in the active state, the quasi-passive linear pneumatic actuator facilitates storage of energy upon a first rotation of the first and second support members about the joint and release of energy upon a second rotation of the first and second support members about the joint in a direction opposite a direction of the first rotation to apply a secondary torque to the joint,
 wherein the quasi-passive linear pneumatic actuator operates in the inactive state with the valve in the open position upon primary power loss to the quasi-passive linear pneumatic actuator.

46. A method for configuring a robotic joint system with integrated safety, the method comprising:
 rotatably coupling a first support member to a second support member via a tunable actuator joint assembly comprising a joint having an axis of rotation about which the first support member and the second support member rotate;

configuring the tunable actuator joint assembly to comprise a primary actuator operable to apply a primary torque to cause rotation of the first and second support members about the joint;

configuring the tunable actuator joint assembly with a quasi-passive linear pneumatic actuator;

configuring the tunable actuator joint assembly with a valve operable to control operation of the quasi-passive linear pneumatic actuator, the valve being operable to default to an open position;

configuring the quasi-passive linear pneumatic actuator to comprise an inactive state with the valve open, wherein in the inactive state, the quasi-passive linear pneumatic actuator facilitates return of the first and second support members to a default position about the joint;

configuring the quasi-passive linear pneumatic actuator to comprise an active state with the valve closed, wherein in the active state, the quasi-passive linear pneumatic actuator facilitates storage of energy upon a first rotation of the first and second support members about the joint and release of energy upon a second rotation of the first and second support members about the joint in a direction opposite a direction of the first rotation to apply a secondary torque to the joint;

coupling a piston rod of the quasi-passive linear pneumatic actuator to one of the first support member or the second support member such that actuation of the piston rod applies the secondary torque to one of the first support member or the second support member, wherein the piston rod is coupled to one of the first support member or the second support member via a linkage, and wherein the housing is coupled to the other of the first support member or the second support member; and coupling the linkage to the output member of the primary actuator.

* * * * *